(12) United States Patent
Mamo et al.

(10) Patent No.: US 11,951,949 B2
(45) Date of Patent: Apr. 9, 2024

(54) COLLAPSIBLE CARGO ORGANIZER

(71) Applicant: AURIA SOLUTIONS UK I LTD., London (GB)

(72) Inventors: Robert Mamo, Northville, MI (US); Gabriel B. Beck, Jr., North Canton, OH (US); Alan Harrison, County Mayo (IE); Ben Millett, County Roscommon (IE); Michael Culleton, County Dublin (IE)

(73) Assignee: Auria Solutions UK I, Ltd., London (GB)

( * ) Notice: Subject to any disclaimer, the term of this patent is extended or adjusted under 35 U.S.C. 154(b) by 352 days.

(21) Appl. No.: 17/350,526

(22) Filed: Jun. 17, 2021

(65) Prior Publication Data

US 2021/0394681 A1    Dec. 23, 2021

Related U.S. Application Data

(60) Provisional application No. 63/040,380, filed on Jun. 17, 2020.

(51) Int. Cl.
| | |
|---|---|
| *B60P 7/08* | (2006.01) |
| *B60R 7/00* | (2006.01) |
| *B60R 7/02* | (2006.01) |

(52) U.S. Cl.
CPC .............. *B60R 7/00* (2013.01); *B60P 7/0892* (2013.01); *B60R 7/02* (2013.01)

(58) Field of Classification Search
CPC .................................. B60R 7/02; B60P 7/0892
See application file for complete search history.

(56) References Cited

U.S. PATENT DOCUMENTS

| | | | | |
|---|---|---|---|---|
| 3,385,450 | A | * | 5/1968 | Nadler .................... A47B 65/00 |
| | | | | 211/184 |
| 5,129,612 | A | * | 7/1992 | Beaupre .................... B60R 7/02 |
| | | | | 224/539 |
| 6,334,539 | B1 | * | 1/2002 | Jajko ...................... A47B 65/00 |
| | | | | D19/34.1 |
| 10,676,005 | B2 | * | 6/2020 | Schnur .................... B60N 3/048 |
| 10,737,609 | B2 | * | 8/2020 | Stanesic .................... B60P 7/14 |
| D924,785 | S | * | 7/2021 | Mamo .......................... D12/426 |
| 2004/0134946 | A1 | | 7/2004 | Gammon |

(Continued)

OTHER PUBLICATIONS

International Search Report and Written Opinion of the International Searching Authority of International Application No. PCT/US2021/37814, dated Sep. 24, 2021, 8 pages.

*Primary Examiner* — Justin M Larson
(74) *Attorney, Agent, or Firm* — Grossman, Tucker, Perreault & Pfleger PLLC; Steven J. Grossman

(57) ABSTRACT

A collapsible cargo organizer is provided, comprising: a rotatable panel; a supporting base comprising a floor plate; wherein the rotatable panel is rotatable from a horizontal position to a vertical position and vice-versa; wherein, when the rotatable panel is in the vertical position, the rotatable panel provides a vertical panel to laterally support at least one article placeable in an article containing space of the collapsible cargo organizer which overlies the floor plate of the supporting base; and wherein the floor plate of the supporting base overlied by the article containing space when the rotatable panel is in the vertical position is covered by the rotatable panel when the rotatable panel is in the horizontal position.

22 Claims, 28 Drawing Sheets

(56) References Cited

U.S. PATENT DOCUMENTS

| | | |
|---|---|---|
| 2015/0130220 A1 | 5/2015 | Preisler et al. |
| 2016/0250977 A1 | 9/2016 | Thom et al. |
| 2017/0158141 A1* | 6/2017 | Dhillon .................. B60R 5/045 |
| 2019/0232859 A1 | 8/2019 | Stanesic |
| 2019/0381929 A1 | 12/2019 | Millett et al. |
| 2021/0129736 A1* | 5/2021 | Mamo ....................... B60R 5/04 |

* cited by examiner

COLLAPSIBLE CARGO ORGANIZER

CROSS REFERENCE TO RELATED APPLICATIONS

This application claims benefit of U.S. provisional application Ser. No. 63/040,380 filed Jun. 17, 2020, the entire disclosure of which is incorporated herein by reference.

FIELD

The present disclosure relates a collapsible cargo organizer, particularly configured to operate in a rear cargo storage area/compartment of a motor vehicle, such as land/ground vehicles (e.g. passenger vehicles such as sedans, sport utility vehicles, pick-up trucks, buses; goods vehicles such as vans, delivery vehicles, light trucks and heavy (tractor-trailer) trucks; campers and recreational vehicles (RV); and train cars of trains), watercrafts (e.g. boats), or aircrafts (e.g. planes).

BACKGROUND

The rear cargo storage area/compartment of a motor vehicle is often utilized most commonly for the storage of groceries or other articles such as packages, boxes and luggage. The rear cargo storage area/compartment may be completely enclosed by the vehicle. In certain instances, the enclosed cargo storage area/compartment may be open to the passenger compartment (e.g. rearward of the rear seating in a minivan or sport utility vehicle), while in other instances the enclosed cargo storage area/compartment may be separated from the passenger compartment (e.g. trunk of a sedan). In still other instances, the rear cargo storage area/compartment of a motor vehicle may have an open top side (e.g. tonneau of a pick-up truck).

During motor vehicle use, occupants often place articles in a rear cargo storage area/compartment of the motor vehicle, typically when such articles are too bulky to be stored in the passenger compartment. Unfortunately, during use of the motor vehicle, the articles may be apt to move around, either by tipping, falling, rolling or sliding on the supporting structure of the motor vehicle. This may cause the damage to the articles, or make them more difficult to be retrieved when being removed from the cargo storage area/compartment.

Certain cargo organizers are known, sold under the Stayhold® brand, which have a right angle, L-shape geometry (e.g. Stayhold part no. STA-30015-USA), as well as those disclosed in U.S. publication no. 2019/0381929 published Dec. 19, 2019 entitled "Free-Standing Holder Device" in the name of Stayhold Limited. However, the foregoing geometries are not collapsible as to create a planar structure in a collapsed state.

The present disclosure provides a collapsible cargo organizer which may be used to inhibit movement of articles in the rear cargo storage area/compartment of the motor vehicle, as well as a collapsible design which collapses to a planar structure to reduce space when not in use and lends itself to store in various places of the vehicle.

SUMMARY

A collapsible cargo organizer is disclosed, which is particularly configured to operate in a cargo storage area/compartment of a motor vehicle, such as an automobile. The rear cargo storage area/compartment may be completely enclosed by the vehicle. In certain instances, the enclosed cargo storage area/compartment may be open to the passenger compartment (e.g. rearward of the rear seating in a minivan or sport utility vehicle), while in other instances the enclosed cargo storage area/compartment may be separated from the passenger compartment (e.g. trunk of a sedan). In still other instances, the rear cargo storage area/compartment of a motor vehicle may have an open top side (e.g. tonneau of a pick-up truck).

In at least one embodiment, the collapsible cargo organizer may comprise a rotatable panel; and a supporting base comprising a floor plate; wherein the rotatable panel is rotatable from a horizontal position to a vertical position and vice-versa. When the rotatable panel is in the vertical position, the rotatable panel provides a vertical panel to laterally support at least one article placeable in an article containing space of the collapsible cargo organizer which overlies the floor plate of the supporting base. The floor plate of the supporting base overlied by the article containing space when the rotatable panel is in the vertical position is covered by the rotatable panel when the rotatable panel is in the horizontal position.

In at least one embodiment, the rotatable panel and the floor plate form a hinge of the collapsible cargo organizer; and the rotatable panel is rotatable from the horizontal position to the vertical position and vice-versa via the hinge.

In at least one embodiment, the hinge comprises at least one hinge pin and at least one hinge pin receptacle.

In at least one embodiment, the floor plate comprises the at least one hinge pin; and the rotatable panel comprises the at least one hinge pin receptacle.

In at least one embodiment, the hinge is formed solely by the rotatable panel and the floor plate.

In at least one embodiment, the collapsible cargo organizer further comprises a decorative applique; the rotatable panel comprises a top side and a bottom side; and the decorative applique is disposed on at least one of the top side or the bottom side of the rotatable panel.

In at least one embodiment, the rotatable panel comprises a front cover and a back cover.

In at least one embodiment, the rotatable panel is a hollow panel with an inner cavity disposed between the front cover and the back cover.

In at least one embodiment, the front cover and the back cover are formed as distinct components which are mechanically connected.

In at least one embodiment, the front cover and the back cover are mechanically connected by one or more engagement hooks mechanically connected to one or more hook engagement receptacles, respectively.

In at least one embodiment, the front cover comprises the one or more hook engagement receptacles; the back cover comprises the one or more engagement hooks; the one or more hook engagement receptacles each comprise an engagement lip protruding laterally in a hook engagement receptacle window; and the one or more engagement hooks mechanically engage with the engagement lips of the one or more hook engagement receptacles, respectively.

In at least one embodiment, the supporting base further comprises a gripper underlay; and the gripper underlay underlies the floor plate.

In at least one embodiment, the gripper underlay is formed of a polymer composition which is an elastomer; and the gripper underlay is an injection molded underlay molded in-situ to the floor plate.

In at least one embodiment, the gripper underlay includes a bumper which overlies an end of the floor plate at an opening/closing side of the rotatable panel.

In at least one embodiment, the supporting base includes a plurality of upwardly directed gripper projections connected to the floor plate and a plurality of downwardly directed gripper projections connected to the floor plate.

In at least one embodiment, the plurality of upwardly directed gripper projections extend through an opening in the floor plate from beneath the floor plate.

In at least one embodiment, the plurality of upwardly directed gripper projections and the plurality of downwardly directed gripper projections are formed of a single piece molding.

In at least one embodiment, the collapsible cargo organizer further comprises a hinge; the collapsible cargo organizer has a front side, a rear side, a left side and a right side; the rotatable panel is rotatable from a horizontal position to a vertical position and vice-versa about the hinge; and the hinge is disposed in-board of the front side, the rear side, the left side and the right side of the collapsible cargo organizer.

In at least one embodiment, the collapsible cargo organizer further comprises a hinge; a hinge cover comprising a hinge receptacle; the hinge disposed in the hinge receptacle; the collapsible cargo organizer comprises a front side, a rear side, a left side and a right side; and the hinge cover is disposed out-board of the hinge at the rear side, the left side and the right side of the collapsible cargo organizer.

In at least one embodiment, the collapsible cargo organizer further comprises a hinge cover; and the hinge cover inhibits rotation of the rotatable panel when the rotatable panel is rotated beyond the vertical position.

In at least one embodiment, the collapsible cargo organizer further comprises a releasable catch mechanism which releasably retains the rotatable panel in the vertical position.

In at least one embodiment, the releasable catch mechanism comprises at least one detent and at least one detent receptacle, wherein the at least one detent occupies the at least one detent receptacle when the rotatable panel is in the vertical position.

FIGURES

The above-mentioned and other features of this disclosure, and the manner of attaining them, will become more apparent and better understood by reference to the following description of embodiments described herein taken in conjunction with the accompanying drawings, wherein.

DETAILED DESCRIPTION

Figure 1A:
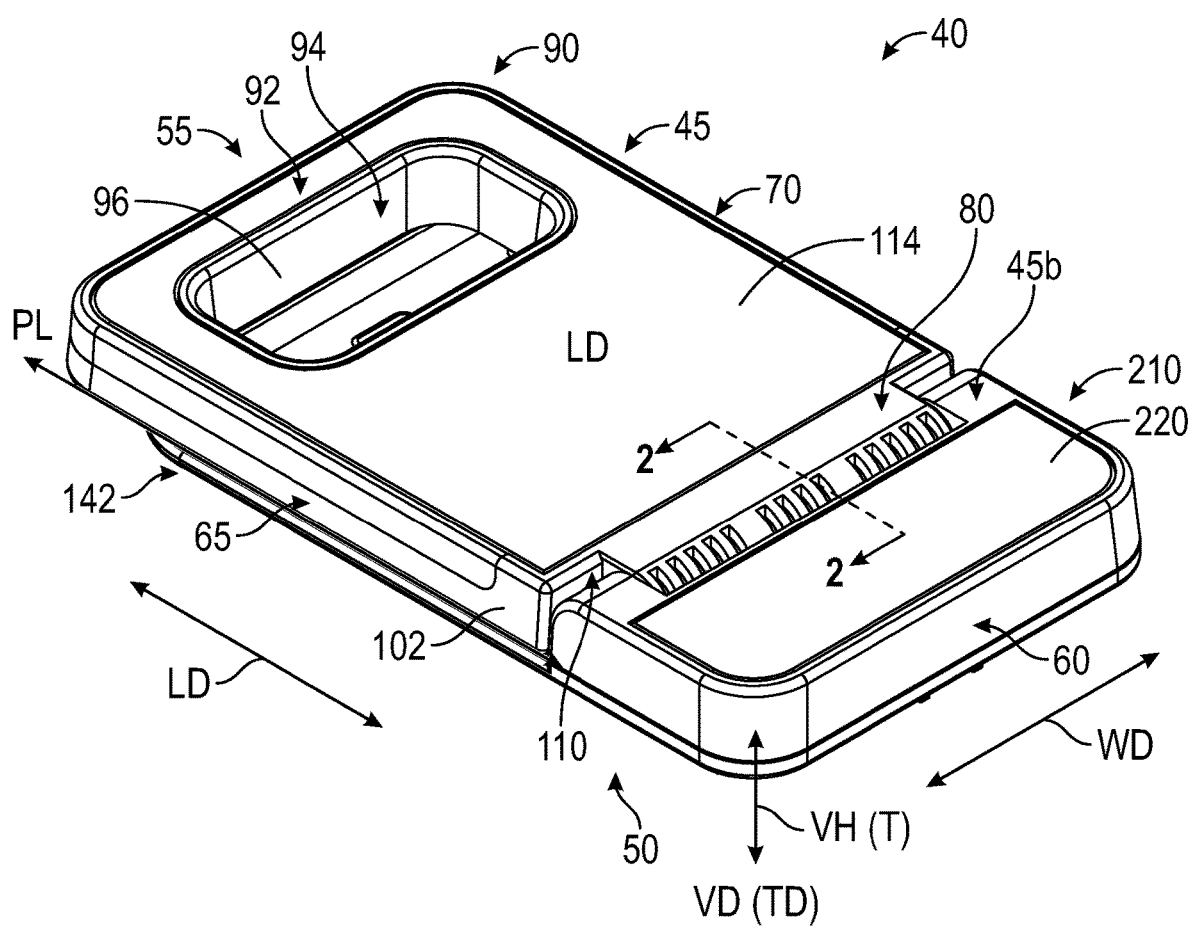
FIG. 1A is an isometric view of a top side of a collapsible cargo organizer, in a closed position, according to the present disclosure.

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

Referring to FIGS. 1A-3B, there is shown a freestanding collapsible cargo organizer 40 according to the present disclosure, which is particularly configured to operate in a cargo storage area/compartment of a motor vehicle, such as an automobile. As may be appreciated, collapsible cargo organizer 40 may be moved from one location to a different location within the cargo storage area/compartment of the motor vehicle, and also may be used with additional collapsible cargo organizers 40 within the cargo storage area/compartment of the motor vehicle. As also may be appreciated, collapsible cargo organizer 40 may be portable, and thus may be transferred from one vehicle to another vehicle for use, particularly without disassembly/reassembly of the collapsible cargo organizer 40 or the vehicle. Stated another way, use of the collapsible cargo organizer 40 is not exclusively tied to a particular location for use, or a particular motor vehicle.

For purposes of orientation and further discussion, the collapsible cargo organizer 40 may be understood to have a top side 45, a bottom side 50, a front longitudinal side 55 (opening/closing side), a rear longitudinal side 60, a left lateral side 65 and a right lateral side 70.

Collapsible cargo organizer 40 comprises a planar rotatable panel 90, which rotates from a horizonal (first) position HP (shown in FIG. 1A) to a vertical (second) position VP (shown in FIGS. 3A-3B), as well as vice-versa, during use of collapsible cargo organizer 40. When opened, the rotatable panel 90 and a supporting base 142 separate along a horizontal parting line PL. Supporting base 142 may be disposed on any suitable underlying supporting structure of the motor vehicle (e.g. a cargo area load floor/platform, such as provided by a textile (e.g. carpet) covered trim panel, a pick-up bed load floor, and a cargo area tray/floor mat)

As shown, rotatable panel 90 may rotate relative to a supporting base 142 via snap-fit hinge 80, and may include an integrated handle 92 and a handle opening 94 to grasp the collapsible cargo organizer 40. As shown the handle opening 94 is defined by an enclosed collar (closed flange) 96 formed in a front cover 102 of the rotatable panel 90.

The horizontal position HP may also be referred to as the closed position or the down position, while the vertical position VP may also be referred to as the opened position or the up position. In rotating from the horizontal position HP to the vertical position VP, a rotation angle $\alpha$ of the rotatable panel 90 may be about 90 degrees (e.g. in a range of 85-95 degrees), with the rotatable panel 90 being substantially transverse, and more particularly substantially perpendicular, to a floor plate 152 of the supporting base 142.

Figure 1B:
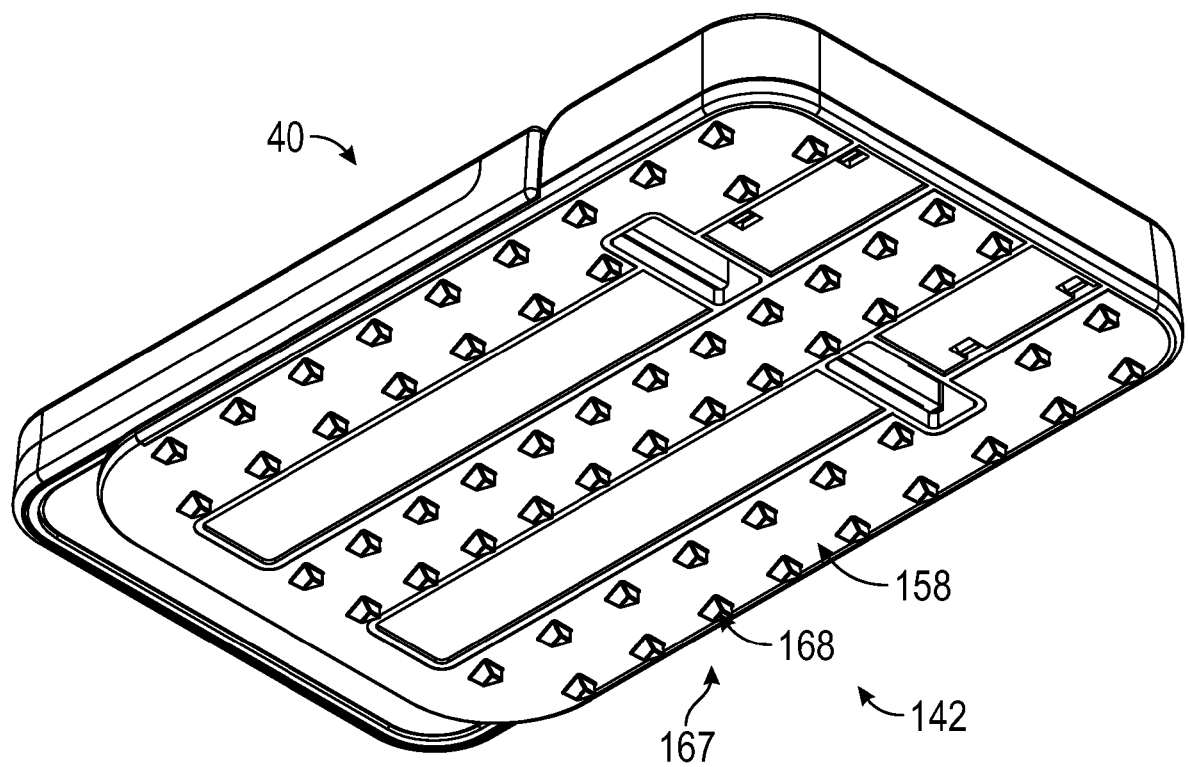
FIG. 1B is an isometric view of a bottom side of the collapsible cargo organizer of FIG. 1A, in the closed position.
Figure 3A:
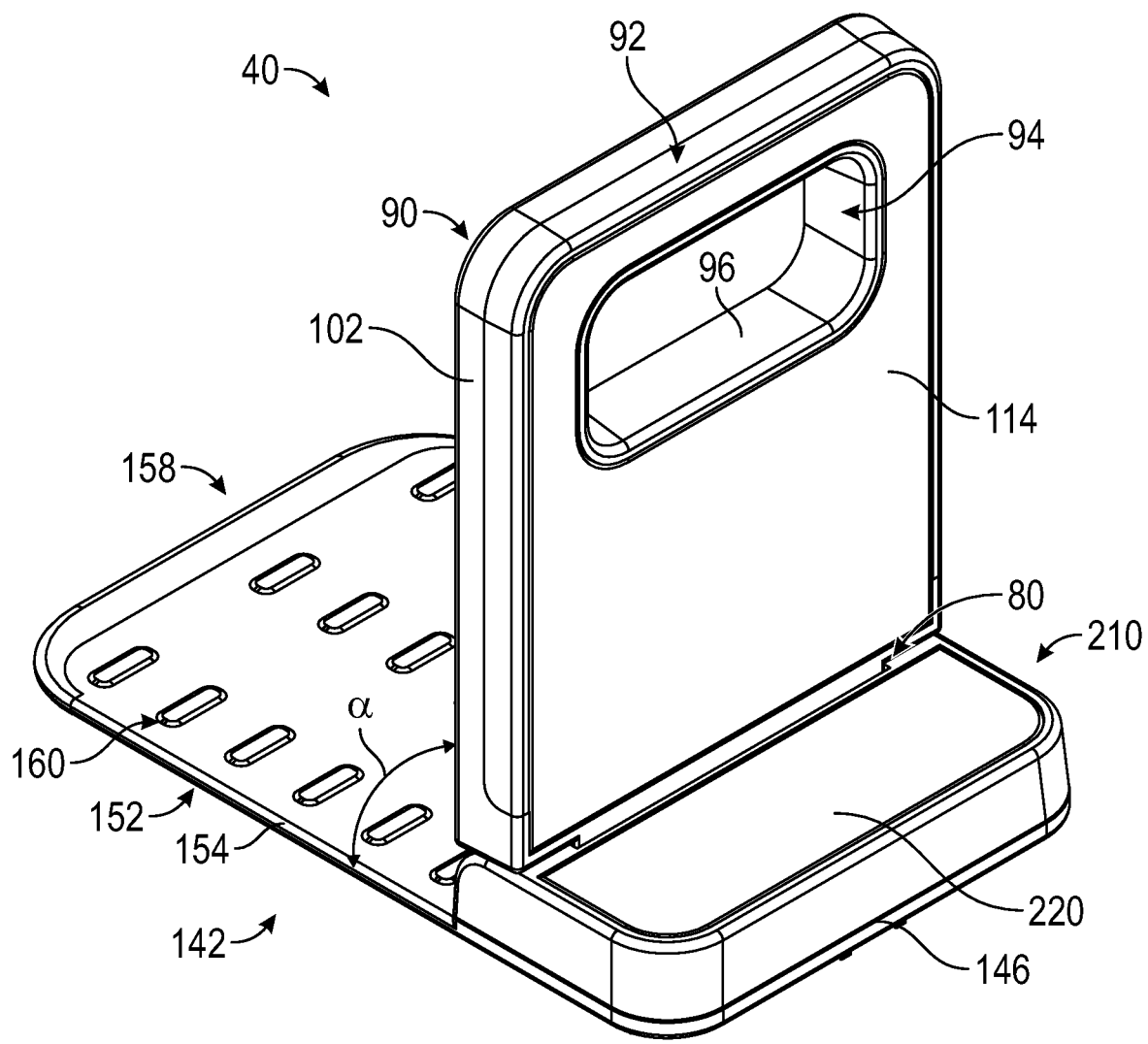
FIG. 3A is an isometric view of the collapsible cargo organizer of FIG. 1A, in an opened position, viewed from a rear longitudinal side of the collapsible cargo organizer.
Figure 3B:
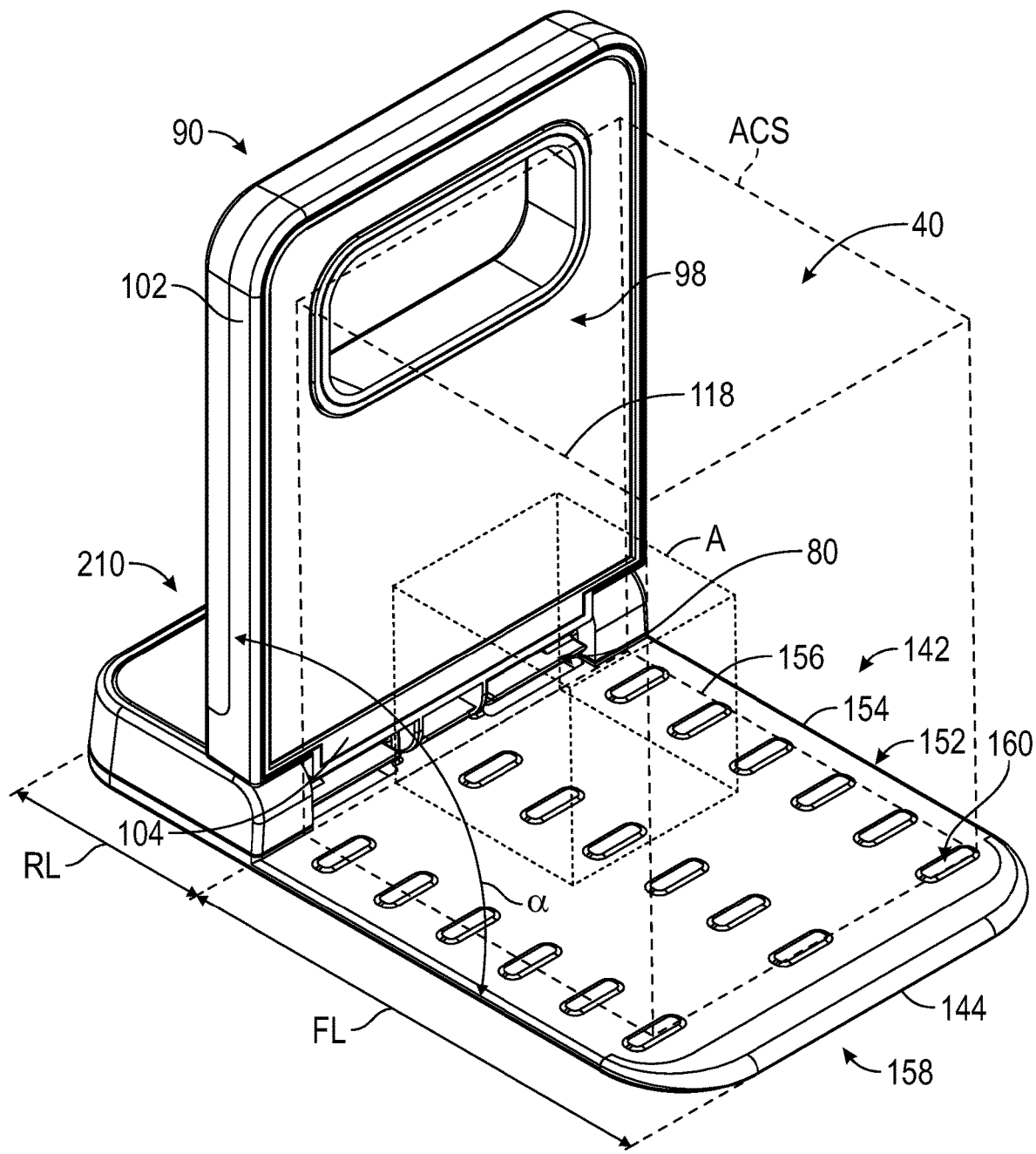
FIG. 3B is an isometric view of the collapsible cargo organizer of FIG. 1A, in an opened position, viewed from a front longitudinal side of the collapsible cargo organizer.

When rotatable panel 90 is in the vertical position VP shown in FIG. 3B, the collapsible cargo organizer 40 forms a T-shape such that the collapsible cargo organizer 40 provides a vertical panel to laterally support one or more articles A, which may be at least partially or wholly placed in an article containing space ACS overlying a supporting base 142 which is disposed (covered) underneath the rotatable panel 90 when the rotatable panel 90 is in the horizontal position HP (See FIG. 1B). More particularly, the T-shape of FIG. 3B may be more specifically referred to as an oblong T-shape, in that the two parallel legs of the T-shape have two different longitudinal lengths. Exemplary articles A may include boxes/bags containing groceries or other consumer products, or any other article which may be subject to tilt, fall, roll or slide within a cargo storage area/compartment of a motor vehicle during use of the motor vehicle.

From FIG. 3B, it should be understood that while the article containing space ACS is shown to be less than the length and the width of the supporting base 142 (in the length direction LD and the width direction WD, respectively) covered by the rotatable panel 90 when the rotatable panel 90 is in the horizontal position HP (See FIGS. 1A and 1B), such is done solely for illustrative purposes, and the article containing space ACS may include any portion of the supporting base 142 (and more particularly a floor plate 152 of the supporting base 142) covered by the rotatable panel 90 which would underlie article A.

Also from FIG. 3B, bottom side 98 of the rotatable panel 90, which also may be understood as the article engagement or contact face of the rotatable panel 90, is disposed at a location of the longitudinal length of the collapsible cargo organizer 40 that is between the front longitudinal end 144 and the rear longitudinal end 146 (See FIG. 3A) of the supporting base 142. As shown, the bottom side 98 of the rotatable panel 90, when arranged in the vertical position VP, is disposed at a location where 60%-80% of the end-to-end longitudinal length of the supporting base 142 is forward of the bottom side 98 of the rotatable panel 90, which may be referred to as the forward length FL of the supporting base 142. Alternatively, the bottom side 98 of the rotatable panel 90, when arranged in the vertical position VP, is disposed at a location where 20%-40% of the end-to-end longitudinal length of the supporting base 142 is rear of the bottom side 98 of the rotatable panel 90, which may be referred to as the rearward length RL of the supporting base 142.

In the foregoing manner, it may be appreciated that, when article A is disposed on the forward length FL of the supporting base 142, the forward length FL is secured/ clamped between article A and the supporting structure of the motor vehicle underlying the forward length FL, particularly by the downward force of the weight of article A, acting in conjunction with gravity. The downward force acting on the forward length FL then inhibits the forward length FL from moving laterally away from the article A during transit, which in turn inhibits the rotatable panel 90 from moving laterally away from the article A. As such, the rotatable panel 90 in the vertical position VP remains adjacent the article A to provide vertical support adjacent the article A.

It may also be appreciated that, with a particularly tall article A having a relatively high center of gravity, the rearward length RL of the supporting base 142 acts as a right-angle support for the rotatable panel 90 in the vertical position VP to inhibit the collapsible cargo organizer 40 from rotating back on itself 90 degrees and tipping over. In other words, without the rearward length RL of the supporting base 142, the collapsible cargo organizer 40 could rotate such that rotatable panel 80 in the vertical position VP becomes horizontal and the forward length FL in the horizontal position HP of the supporting base 142 becomes vertical. The foregoing features add to the steadfastness of the collapsible cargo organizer 40 during use.

As shown by FIG. 3B, rotatable panel 90 comprises a front cover 102 and a back cover 104, which are arranged back-to-back. The front cover 102 is shown, prior to assembly with the back cover 104, in FIGS. 4A-4B. Furthermore, in FIG. 4A, a decorative applique 114 (e.g. textile such as carpet or fabric, film or sheet of elastomer or other polymer) shown in FIGS. 1A and 3A has been removed from the top (outer) side of the front cover 102. The back cover 104 is shown, also prior to assembly with the front cover 102, in FIGS. 5A-5B. Furthermore, in FIG. 5A, a decorative applique 118 (e.g. textile such as carpet or fabric, film or sheet of elastomer or other polymer) shown in FIG. 3B has been removed from the bottom (outer) side 98 of the back cover 104. Decorative appliques 114, 118 may be attached to the front cover 102 and the back cover 104 with an adhesive (e.g. pressure sensitive, hot melt).

When assembled, the front cover 102 and the back cover 104 result in the rotatable panel 90 being hollow, i.e. having an inner cavity 106. In inner side of the front cover 102 may include a reinforcing structure 112, such as an arrangement of intersecting ribs (e.g. honeycomb structure). Alternatively, a reinforcing structure 112, such as an arrangement of intersecting ribs (e.g. honeycomb structure) may be arranged on an inside of the bottom cover 104 (See FIG. 11C), in addition to or as an alternative to the reinforcing structure 112 of the front cover 112.

As such, the rotatable panel 90 is configured to be relatively thick to provide enhanced stiffness. For example, the thickness T, which corresponds to vertical height VH when the rotatable panel is in the horizontal position HP, may be in a range of 10 mm to 40 mm.

Referring to FIGS. 4A-4C and 5A-5C, the front cover 102 and the back cover 104 of the rotatable panel 90 may be releasably snap-fit connectable together, particularly mechanically, by cantilevered engagement hooks 140 of the back cover 104 which are received into hook engagement receptacles 128, and releasably engage with the hook engagement receptacles 128, of the front cover 102. More particularly, each of the engagement hooks 140 respectively engage an engagement lip 132 protruding laterally in a hook engagement receptacle window 130 (shown as a polygonal window, particularly a quadrilateral, and more particularly a square, enclosed opening) from one side of the window 130. When engaged, the cantilevered engagement hooks 140 may be disengaged from the engagement lip 132 in the window 130 by being pushed with an appropriate tool in the opposite direction of engagement through the applique 114. Thus, while applique 114 conceals the presence of the cantilevered engagement hooks 140 there beneath, the presence of applique 114 still facilitates disengagement of the cantilevered engagement hooks 140.

In other variants, the front cover 102 and the back cover 104 of the rotatable panel 90 may be mechanically fastened together via screws/screw bosses, heat staked pins, and adhesives.

In other variants, the back cover applique 118, as well as the back cover 104 may be eliminated from the collapsible cargo organizer 40 to simplify the organizer. For example, a low product line may not include either of the back cover 104 or the back cover applique 118, an intermediate product line may add the back cover 104, and a high product line may further add the back cover applique 118.

Figure 4A:
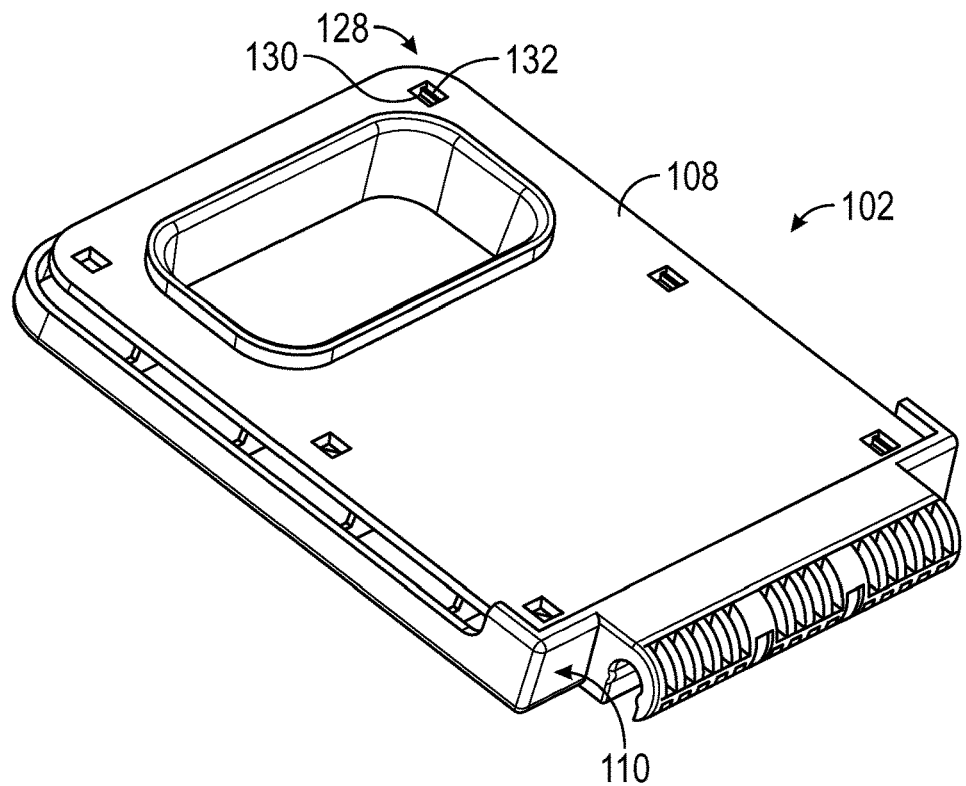
FIG. 4A is an isometric view of a top (outer) side of a rotatable panel front cover of a rotatable panel of the collapsible cargo organizer of FIG. 1A, without the applique.
Figure 4B:
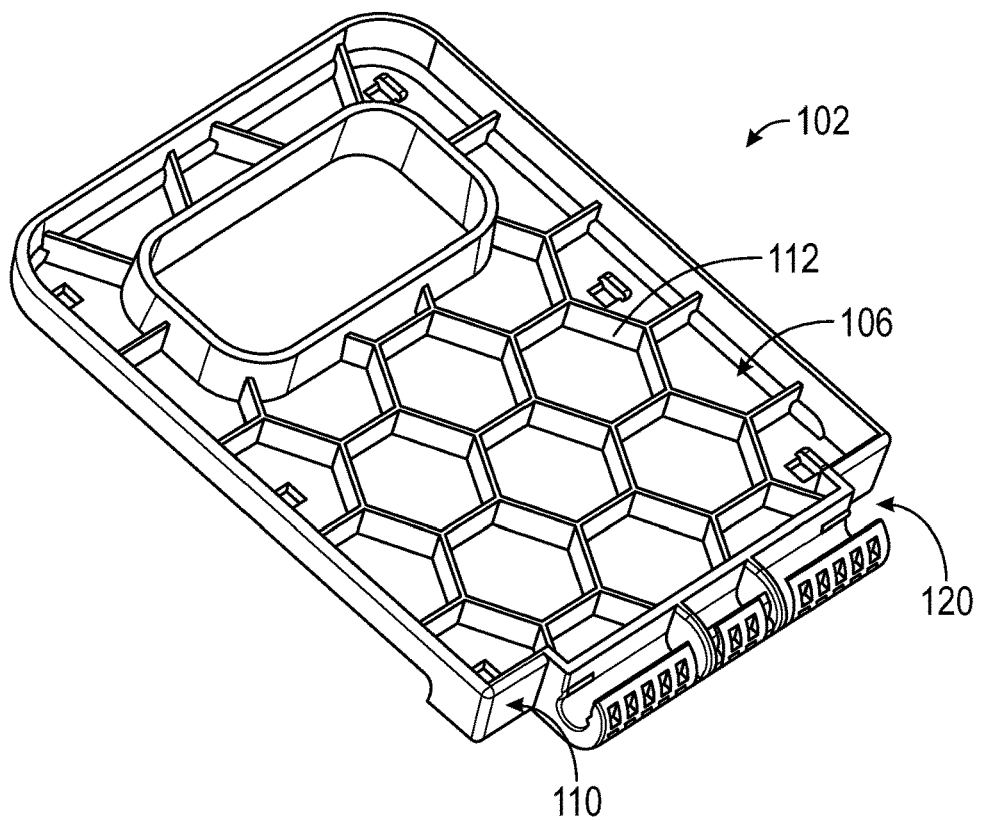
FIG. 4B is an isometric view of an inner side of the rotatable panel front cover of FIG. 4A.
Figure 4C:
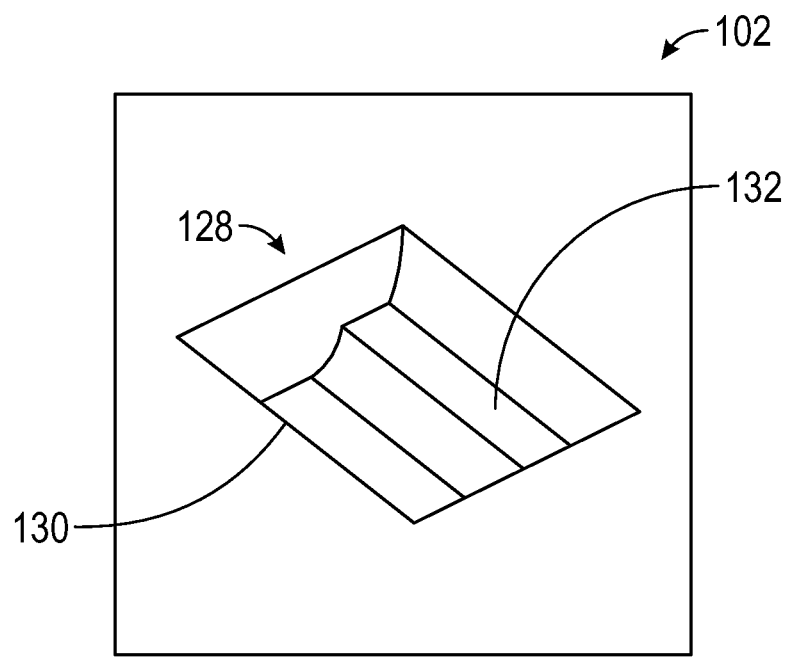
FIG. 4C is a close-up isometric view of a hook engagement receptacle of the rotatable panel front cover of FIG. 4A.
Figure 4D:
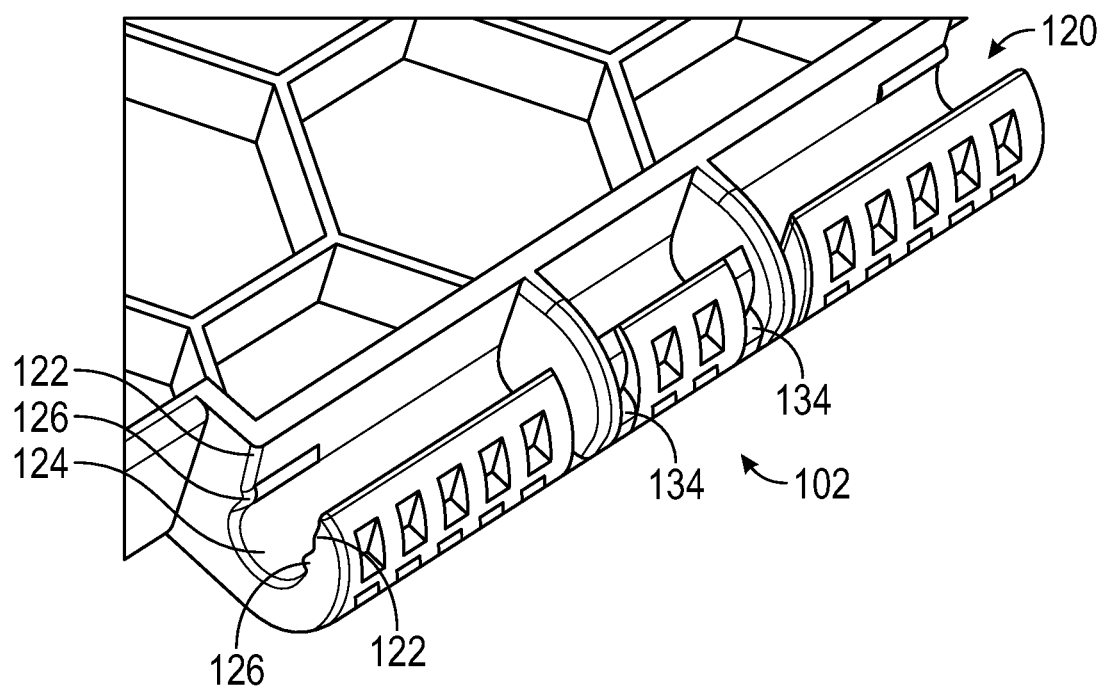
FIG. 4D is a close-up isometric view of a hinge pin receptacle of the rotatable panel front cover of FIG. 4B.
Figure 5A:
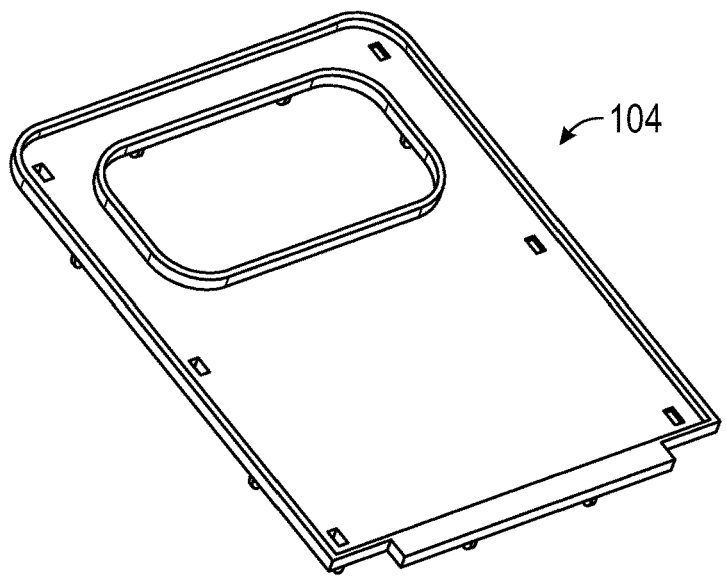
FIG. 5A is an isometric view of a bottom (outer) side of a rotatable panel back cover of the rotatable panel of the collapsible cargo organizer of FIG. 1A, without the applique.
Figure 5B:
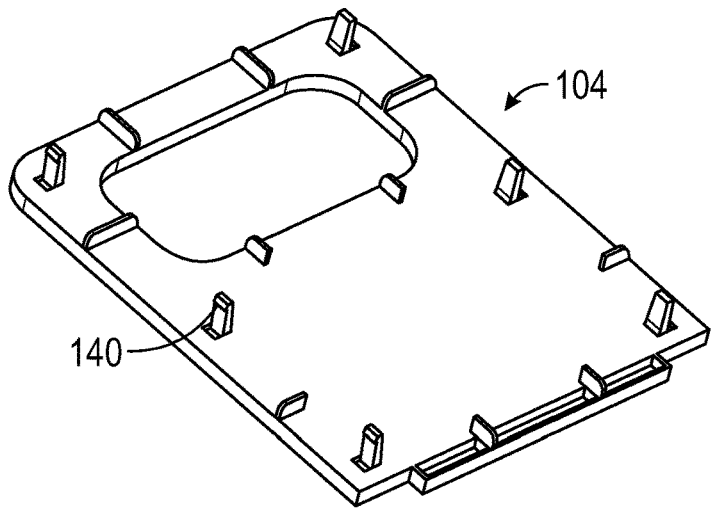
FIG. 5B is an isometric view of an inner side of the rotatable panel back cover of FIG. 5A.
Figure 5C:
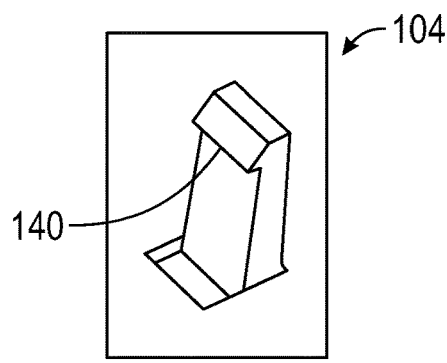
FIG. 5C is a close-up isometric view of an engagement hook of the rotatable panel back cover of FIG. 5B.

As shown, in FIGS. 4A, 4B and 4D, the front cover 102 of the rotatable panel 90 includes at least one hinge pin receptacle 120, and more particularly two hinge pin receptacles 120 which are laterally spaced from one another in the width direction WD of the collapsible cargo organizer 40, which is transverse, and more particularly perpendicular, to the longitudinal direction LD.

As shown by FIG. 4D, each of the hinge pin receptacles 120 has a receptacle wall 122 in a form of a U-shape defining a recess/cavity 124 to contain/retain a stationary hinge pin 200, described in greater detail below. As shown the opposing wall sections 122 also each have a detent 126 which performs a dual function. First, the detents 126 operate a snap-in features to releaseably retain the hinge pin 200 in proper position when fully seated in the U-shaped cavity 124 and inhibit the hinge pin 200 from inadvertently being removed from the hinge pin receptacle 120. In addition, each of the detents 126 function as a catch, which releasably mate with a detent receptacle 204 of the hinge pin 200, described in greater detail below, to releasably retain/catch the front cover 102 and thus the rotatable panel 90, when the front cover 102 rotatable panel 90 is in the vertical position VP, which functions a releasable locking/catch (anti-rotation) mechanism.

Figure 11A:
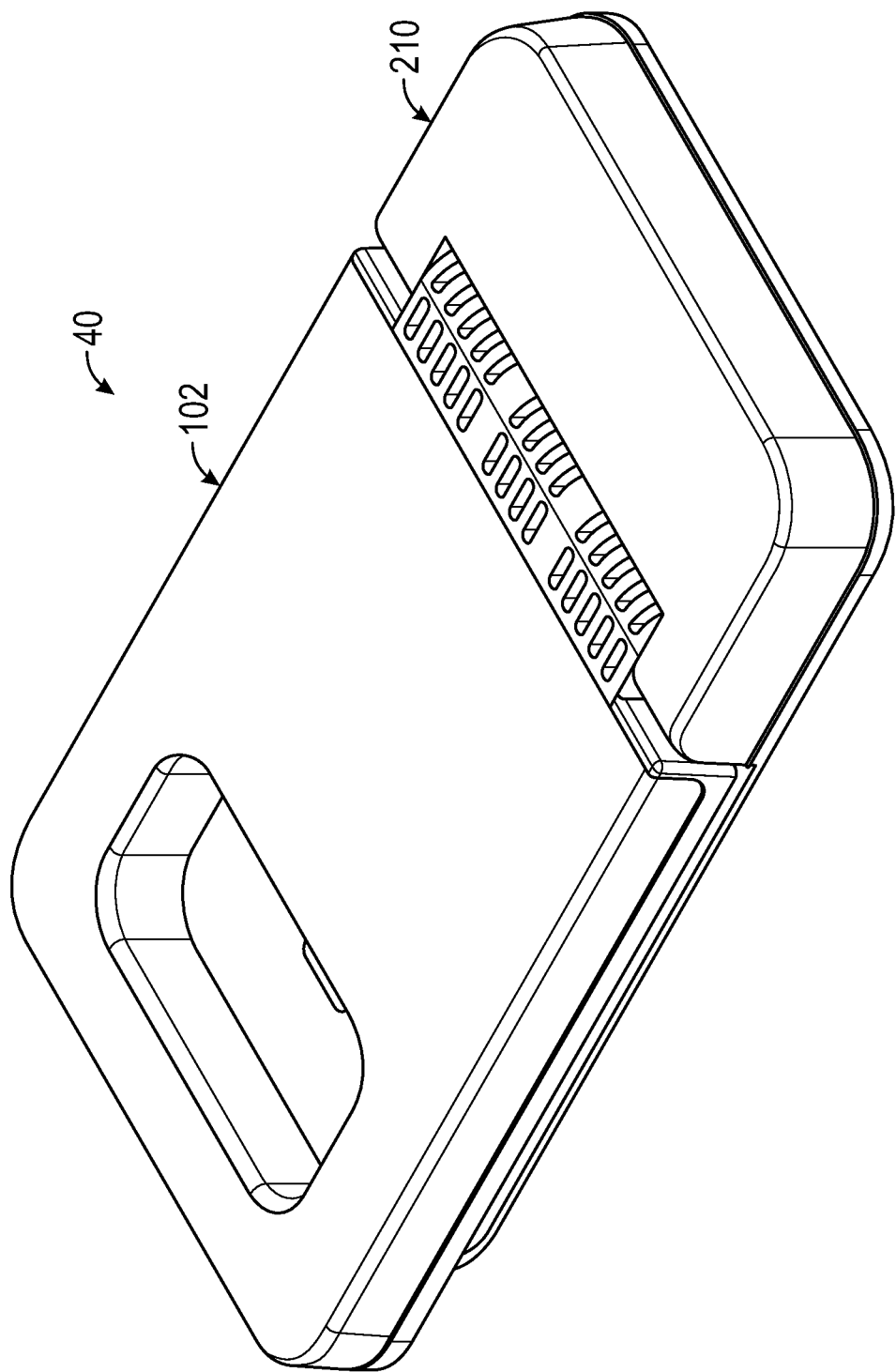
FIG. 11A is an isometric view of a top side of another embodiment of a collapsible cargo organizer, in a closed position, according to the present disclosure.
Figure 11B:
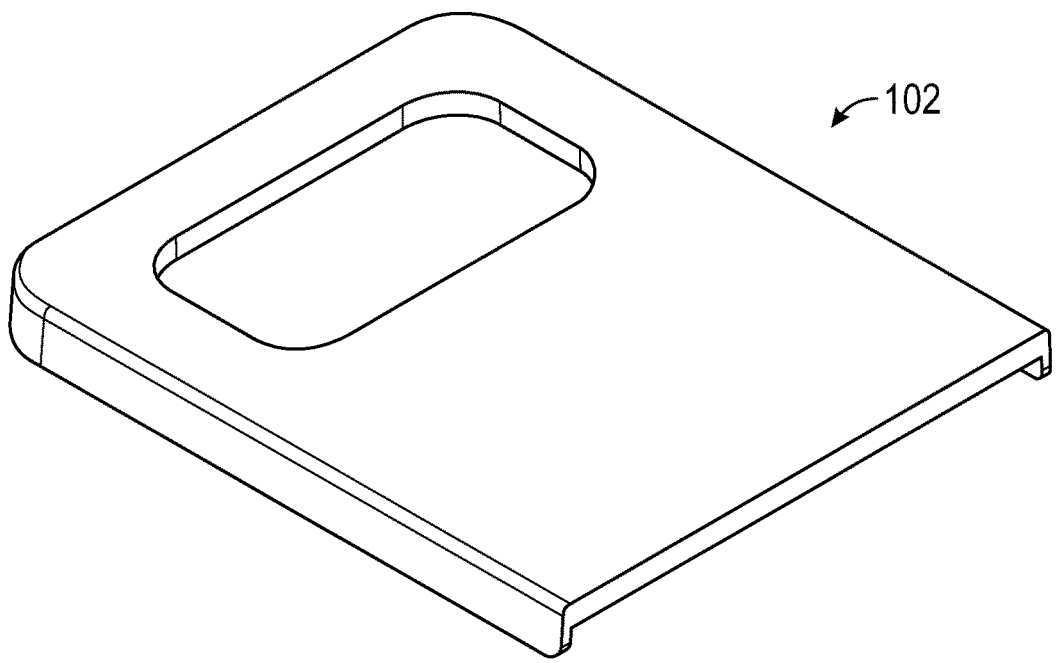
FIG. 11B is an isometric view of a top (outer) side of a rotatable panel front cover of a rotatable panel of the collapsible cargo organizer of FIG. 11A.
Figure 11C:
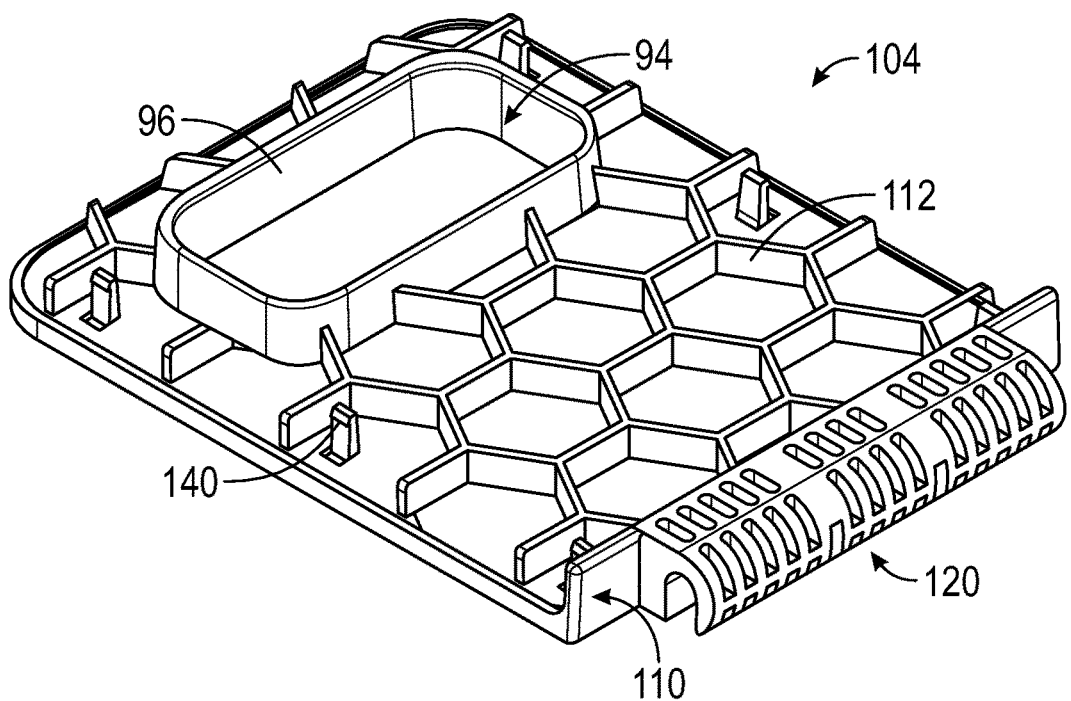
FIG. 11C is an isometric view of an inner side of a rotatable panel back cover of the rotatable panel of the collapsible cargo organizer of FIG. 11A.

Importantly, the hinge 80 is formed solely by the rotatable panel 90 and the supporting base 142, and more particularly, the front cover 102 of the rotatable panel 90, and the floor plate 152 of the supporting base 142. Even more particularly, the hinge pin receptacles 120 are formed as part of a single-piece (monolithic) molding of the front cover 102, and the hinge pins 200 are formed as part of a single-piece (monolithic) molding of the floor plate 152. In the foregoing manner, no additional components are required which are specifically dedicated to the hinge 80, i.e. the hinge 80 is integrated with two components of the collapsible cargo organizer 40 which serve additional purposes. Also, as shown in FIGS. 11A-11C, in a variant of the collapsible cargo organizer 40, the hinge pin receptacles 120 may be formed as part of a single-piece (monolithic) molding of the back cover 104.

As shown by FIGS. 3A-3B, supporting base 142 comprises a floor plate 152 and a base gripper 158, which may also be referred to as a gripper underlay, given it underlines floor plate 152. Such may be made of non-slip/non-slid material and/or have a non-slip geometry which is arranged at the bottom side of the collapsible cargo organizer 40. As used herein, "non-slip" may be understood by one of ordinary skill in the art to mean configured to inhibit slipping/ sliding, which may include reducing likelihood of slipping/sliding or preventing slipping/sliding.

The floor plate 152 and the gripper underlay 158, underlying the rotatable cover 90 when in the horizontal position HP, are planar with a thickness T, which corresponds to a vertical height VH, in a range of 3 mm to 9 mm. It may be appreciated that such is done to provide a top side of the floor plate 152 near flush (e.g. 5 mm or less) the underlying structure on which the collapsible cargo organizer 40 is disposed, to reduce tilting of any article A which is located on both the supporting base 142 and the surrounding platform. The floor plate 152 is shown, prior to assembly with the gripper underlay 158, in FIGS. 6A-6B. The gripper underlay 158 is shown, prior to assembly with the floor plate 152, in FIGS. 7A-7B.

Referring to FIGS. 3A-3B, FIGS. 6A-6C and FIGS. 7A-7C, the floor plate 152 and the gripper underlay 158 may be releasably connectable together, particularly mechanically, by engagement undercuts 164 of upwardly (vertically) directed gripper/underlay projections 160 of the gripper underlay 158 received into gripper/underlay receptacles 184, and releasably engage with the gripper/underlay receptacles 184, of the floor plate 152. More particularly, each of the engagement undercuts 164 of gripper/underlay projections 160 respectively engage an engagement lip 188 of the floor plate 152 protruding laterally in a gripper/underlay receptacle window 186 (shown as a rectangular enclosed opening) around a perimeter of the window 186. Even more particularly, the windows 186, as well as the engagement lips 188 of the floor plate 152 are formed in a planar base panel 154 of the floor plate 152, while gripper/underlay projections 160 extend through the receptacle window 186 in the floor plate 152/base panel 154 from beneath the floor plate 152/base panel 154, respectively. As shown, each of the gripper/underlay projections 160 comprises a head 162 and a neck 166, which form the engagement undercut 164, by virtue of the head 162 being enlarged relative to the neck 166.

As shown, the gripper/underlay projections 160 may be circular projections, while the engagement undercut 164 is a continuous circular undercut extending continuously around the circular projection 160, which releasably engages a continuous engagement lip 188 protruding laterally into gripper/underlay receptacle window 186 as a circular annual ring around the receptacle window 186. Alternatively, as shown, the gripper/underlay projections 160 may be a polygonal (rectangular) projections, while the engagement undercut 164 is a continuous polygonal (rectangular) undercut extending continuously around the polygonal (rectangular) projection 160, which releasably engages a continuous engagement lip 188 protruding laterally into gripper/underlay receptacle window 186 as a polygonal (rectangular) annual ring around the receptacle window 186.

When engaged, the gripper/underlay projections 160 may be disengaged from the engagement lip 188 in the receptacle window 186 by being pushed through the opening of the receptacle 184 from the top side of the floor plate 152 to the bottom side of the floor plate 152.

Alternatively, the floor plate 152 and the gripper underlay 158 may be more permanently connected together, particularly by the gripper underlay 158 being formed in-situ (molded-in-place), preferably via injection molding, to the floor plate 152 and being adhesive (melt) bonded therewith, with or without being mechanically connected via the engagement undercuts 164 of the gripper/underlay projections 160 of the gripper underlay 158 engaging the engagement lip 188 protruding laterally into gripper/underlay receptacle window 186. Alternatively, rather than the gripper underlay 158 being formed in-situ (molded-in-place) with the floor plate 152, the gripper underlay 158 may be adhesively bonded to the floor plate 152 with a separate adhesive (e.g. pressure sensitive adhesive, hot melt adhesive), with or without being mechanically connected via the engagement undercuts 164 of the gripper/underlay projections 160 of the gripper underlay 158 engaging the engagement lip 188 protruding laterally into gripper/underlay receptacle window 186.

In addition to the gripper/underlay projections 160 of the gripper underlay 158 being upwardly (vertically) directed, the gripper/underlay projections 160 extend vertically above top side 156 of the base panel 154 of the floor plate 152. In such manner, the projections 160 may better function as gripper/underlay projections which inhibit an article disposed on the top of the base panel 154 of the supporting base floor plate 152 of the supporting base 142 from sliding off such.

As shown in FIGS. 1B, 2, 7B and 7D, in addition to upwardly directed gripper/underlay projections 160 projecting from a top side of the gripper underlay 158, the supporting base gripper underlay 158 may also include an anchoring mechanism 167, which may particularly comprise downwardly directed gripper/underlay projections 168, which project from a bottom side of the gripper underlay 158. In such manner, gripper/underlay projections 168 may function as nibs/cleats to inhibit the collapsible cargo organizer 40 from sliding on the underlying structure on which it is disposed.

As shown in the foregoing figures, projections/cleats 168 may have a triangular wedge cross-section which narrows as the projections/cleats 168 extends from its proximal end 178 (i.e. where it begins to project) towards its distal end 180 (i.e. where it terminates), which is shown to be a planar and triangular.

Projections/cleats 168 may be arranged such that opposing longitudinal sides 174a, 174b of the triangular cross-section narrow towards a front end 170 to a leading edge 172 of the projections/cleats 168 as the triangular cross-section extends longitudinally along the longitudinal direction LD towards the leading/opening side 55 of the collapsible cargo organizer 40. Moreover, the leading edge 172 at the distal end 180 of the projections/cleats 168 is disposed further rearward that the leading edge 172 at the proximal end 178 of the projections/cleats 168.

Conversely, the same opposing sides 174a, 174b of the triangular cross-section which narrow forwardly separate from one another towards a rear side/end 176 as the triangular cross-section extends longitudinally along the longitudinal direction LD towards the trailing/rear side 60 of the collapsible cargo organizer 40. As shown at the rear side/end 176 of the projections/cleats 168, longitudinal sides 174a, 174b are spaced apart from one another by transverse side 170c. Also, the rear side/end 176 at the distal end 180 of the projections/cleats 168 is disposed further rearward that the rear side/end 176 at the proximal end 178 of the projections/cleats 168.

With the foregoing arrangement, due to its larger surface area, the transverse side 174c of the projections/cleats 168 may inhibit the collapsible cargo organizer 40 from moving laterally away from an article A when disposed on floor plate 152 of supporting base 142, particularly when arranged on a supporting structure 14 such as a fibrous covered load floor, such as a load floor covered with a textile such as carpet, which allowed the projections/cleats 168 to extend into the supporting structure 14. Conversely, due to its smaller surface area, the front/leading edge 172 of the projections/cleats 168 may make it easier to move laterally towards an article A when disposed on floor plate 152 of supporting base 142, such as to get the article A to be disposed against rotatable panel 90 when in the vertical position VP.

Other than projections/cleats 168, collapsible cargo organizer 40 may include other anchor mechanisms 167. For example, collapsible cargo organizer 40 may include any of the anchor mechanisms disclosed in U.S. application No. 62/929,402 filed Nov. 1, 2019 entitled "Collapsible Cargo Management Device"; U.S. publication no. 2020/0108778 published Apr. 9, 2020 entitled "Cargo Management Device Integrated With Trim Panel or U.S. publication no. 2017/0190140 published Jul. 6, 2017 entitled "Extruded Nib Design For Automotive Floor Mats," the entire disclosures of the foregoing applications/publications being incorporated by reference herein.

While the upwardly directed gripper/underlay projections 160 projecting from a top side of the gripper underlay 158 and the downwardly directed gripper/underlay projections 168 projecting from a bottom side of the gripper underlay 158 are all shown to be part of a single piece (monolithic molding), the upwardly directed gripper projections 160 and/or the downwardly directed gripper projections 168 may be disconnected from one another and provided a multiple isolated pieces. For example, the collapsible cargo organizer 40 may have a plurality of isolated gripper projection 160 projecting vertically upward above the top side 156 of the base panel 154 of the floor plate 152 and/or a plurality of isolated gripper projection 168 projecting vertically downward below top side 156 of the base panel 154 of the floor plate 152.

As shown by FIGS. 3A-3B and 7A-7B, gripper underlay 158 may also include an end bumper 182 which overlies a front longitudinal end 190 (i.e. opening/closing end) of the floor plate 152. When bumper 182 is not utilized, the front end 190 of the floor plate 152 may be the front end of the supporting base 142.

In other variants, the gripper underlay 158 may be eliminated in whole or in part from the collapsible cargo organizer 40 to simplify the organizer, in which case gripper/underlay receptacles 184 in the floor plate 152 may also be eliminated. For example, a low product line may not include the gripper underlay 158 and the gripper/underlay projections 168 may be formed on the bottom side of the floor plate 152, an intermediate product line may add the gripper underlay 158 without the bumper 182 and the high product line may add the bumper 182.

Figure 6A:
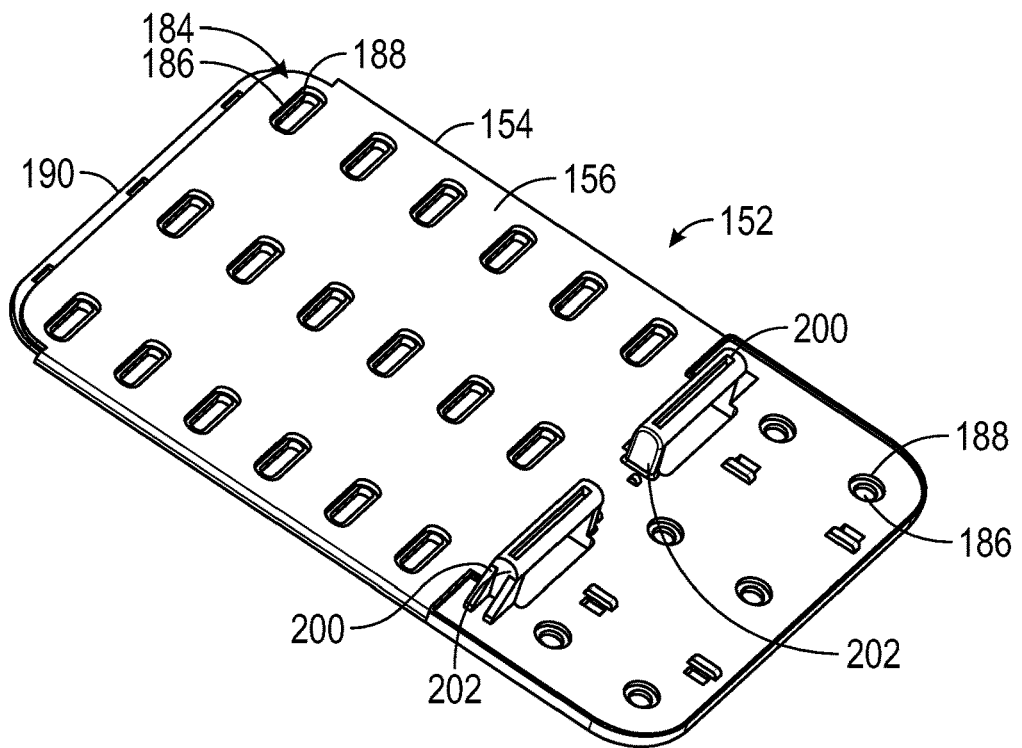
FIG. 6A is an isometric view of a top side of a floor plate of a supporting base of the collapsible cargo organizer of FIG. 1A.
Figure 6B:
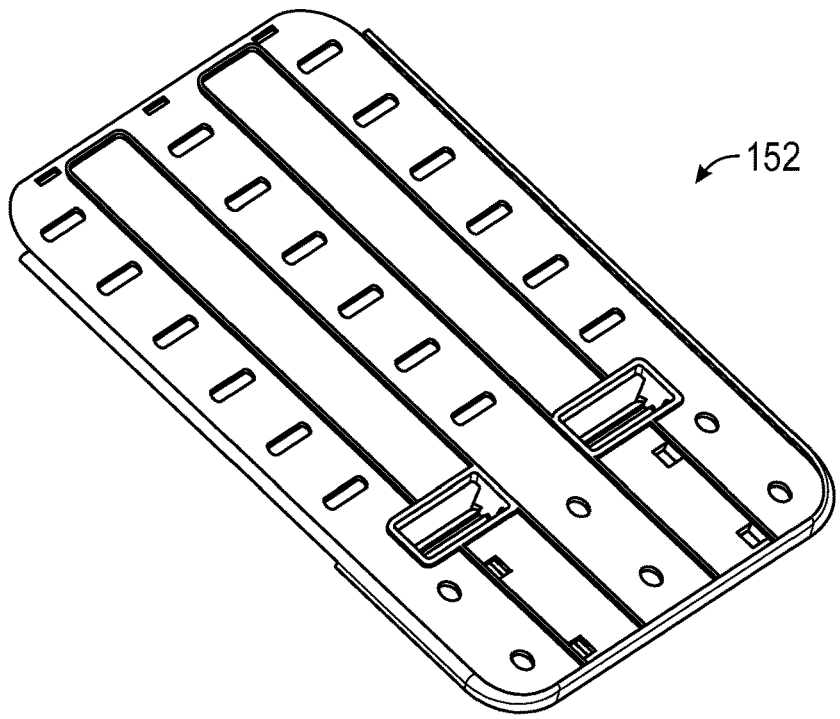
FIG. 6B is an isometric view of a bottom side of the floor plate of FIG. 6A.
Figure 6C:
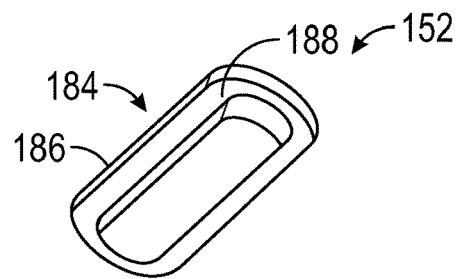
FIG. 6C is a close-up isometric view of a gripper/underlay receptacle of the floor plate of FIG. 6A.
Figure 6D:
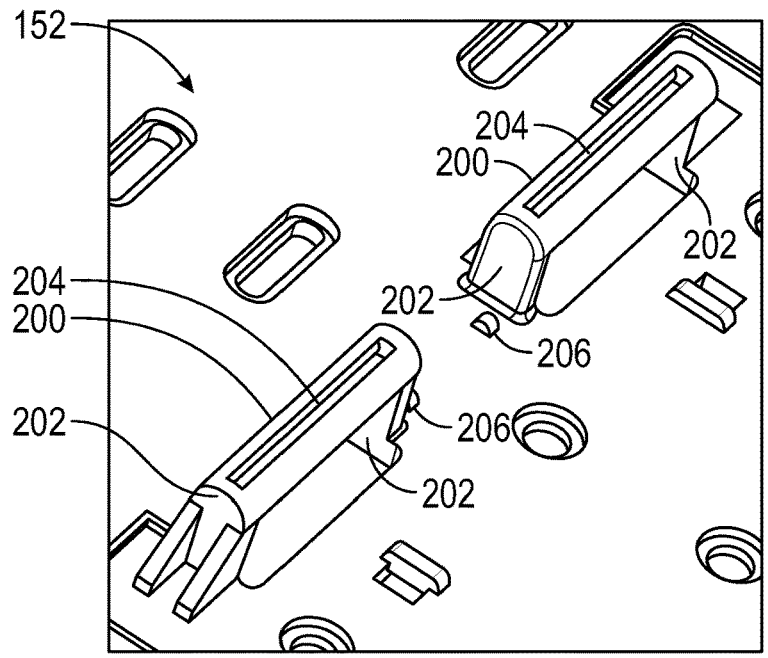
FIG. 6D is a close-up isometric view of a top side of a hinge pin of the floor plate of FIG. 6A.
Figure 6E:
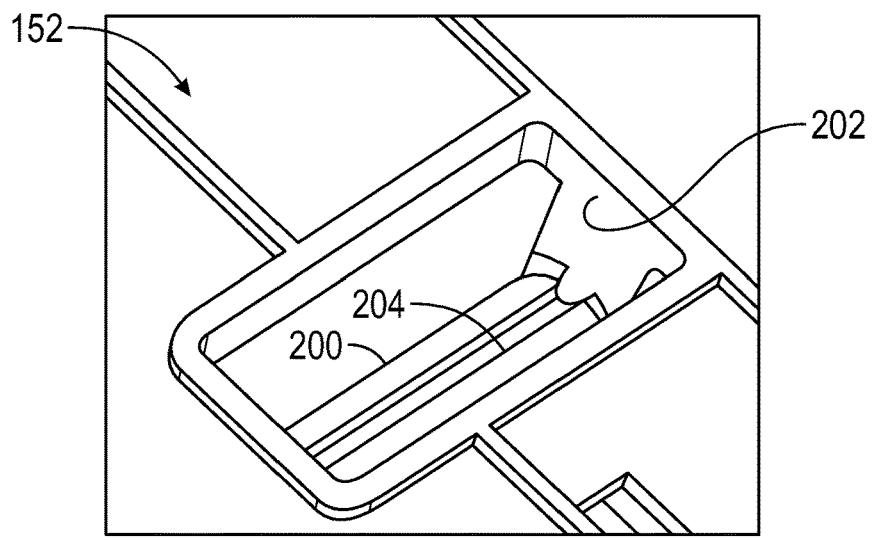
FIG. 6E is a close-up isometric view of a bottom side of the hinge pin of the floor plate of FIG. 6B.
Figure 7A:
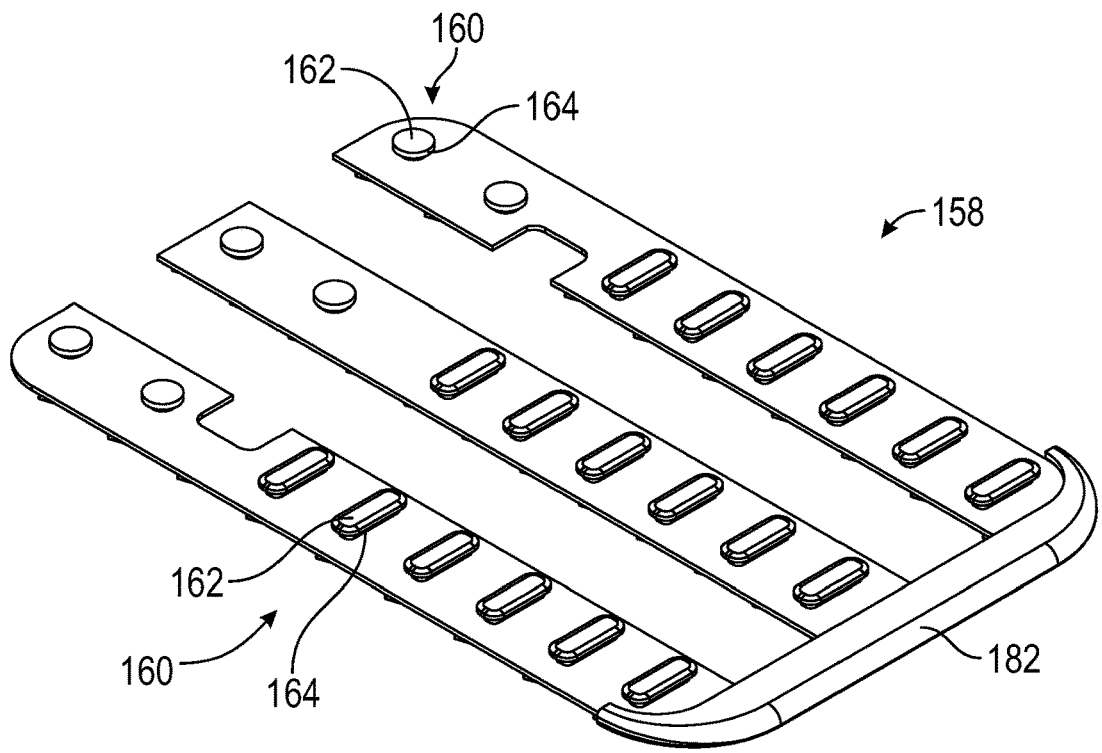
FIG. 7A is an isometric view of a top side of a gripper/underlay of the supporting base of the collapsible cargo organizer of FIG. 1A.
Figure 7B:
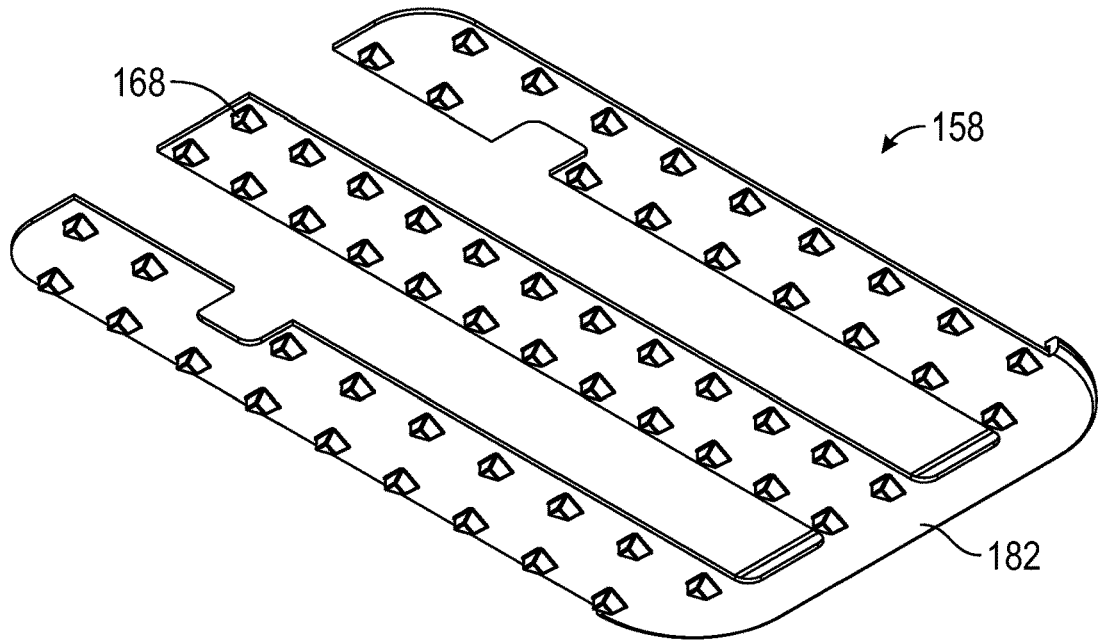
FIG. 7B is an isometric view of a bottom side of the gripper/underlay of FIG. 7A.
Figure 7C:
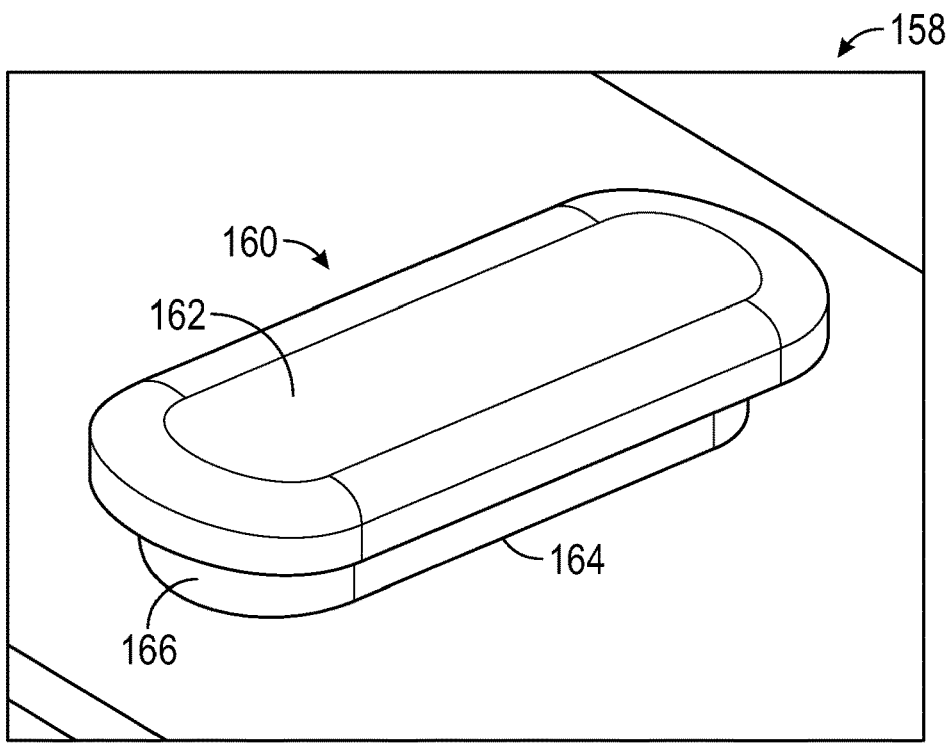
FIG. 7C is a close-up isometric view of a top side (upward) projection of the gripper/underlay of FIG. 7A.
Figure 7D:
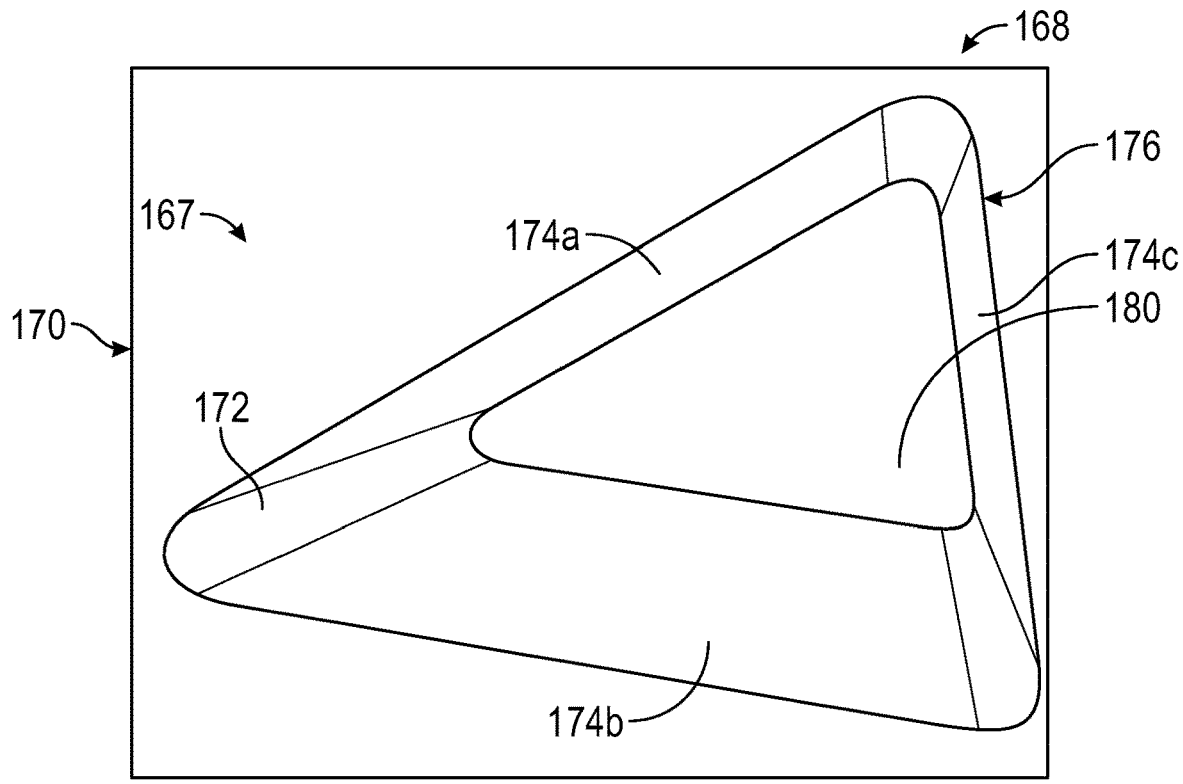
FIG. 7D is a close-up isometric view of a bottom side (downward) projection of the gripper/underlay of FIG. 7B.

As shown by FIGS. 6A, 6D and 6E, floor plate 152 further comprises at least one hinge pin 200, which vertically displaced upward relative to the base panel 154 of the floor plate 152. More particularly, collapsible cargo organizer 40 may have two hinge pins 200 which are laterally spaced from one another on a common axis in a width direction WD of the collapsible cargo organizer 40, which is transverse, and more particularly perpendicular, to the longitudinal direction LD.

As shown, each hinge pin 200 is vertically supported by two hinge pin stanchions 202 disposed at opposing longitudinal ends of the hinge pin 200. When assembled, each hinge pin 200 occupies one of the hinge pin receptacles 120 of the rotatable panel front cover 102, respectively, to form hinge 80. During rotation of the rotatable panel 90, the hinge pin receptacles 120 rotate around the stationary hinge pins 200, respectively.

As shown, each hinge pin 200 further includes two detent receptacles 204 which are arranged on the outer cylindrical side of the hinge pins 200, particularly at 186 degrees to one another. As shown, the detent receptacles 204 each have a longitudinal length which extends along, and more particularly parallel with, the longitudinal axis of the hinge pin 200 and which extends radially inward into the hinge pins 200.

By the arrangement of the detents 126 and the detent receptacles 204, each of the detents 126 occupies a corresponding one of the detent receptacles 204 when the rotatable panel 90 is in the vertical position VP. Such inhibits the rotatable panel 90 from inadvertently rotating back down to the horizontal position HP. When the user then wants to collapse the rotatable panel 90, the user can apply a rotation force to the rotatable panel 90 which is sufficient to overcome the retention/locking of the detents 126 in the detent receptacles 204, causing the detents 126 to be released from the receptacles 204.

Referring to FIGS. 4D and 6D, the releasable locking (anti-rotation) mechanism provided when detents 126 of the hinge pin receptacles 120 occupy the detent receptacles 204 of the hinge pins 200 may be enhanced by additional locking (anti-rotation) features. As shown, the floor plate 152 may include at least one stationary/fixed locking nib 206, while the rotatable panel 90, and more particularly the front cover 102 thereof, may have at least one rotatable locking nib 134, which rotates with the rotation of the rotatable panel 90. Nibs 134 and 206 may best be seen as part of the assembled collapsible cargo organizer in FIG. 2.

Figure 2:
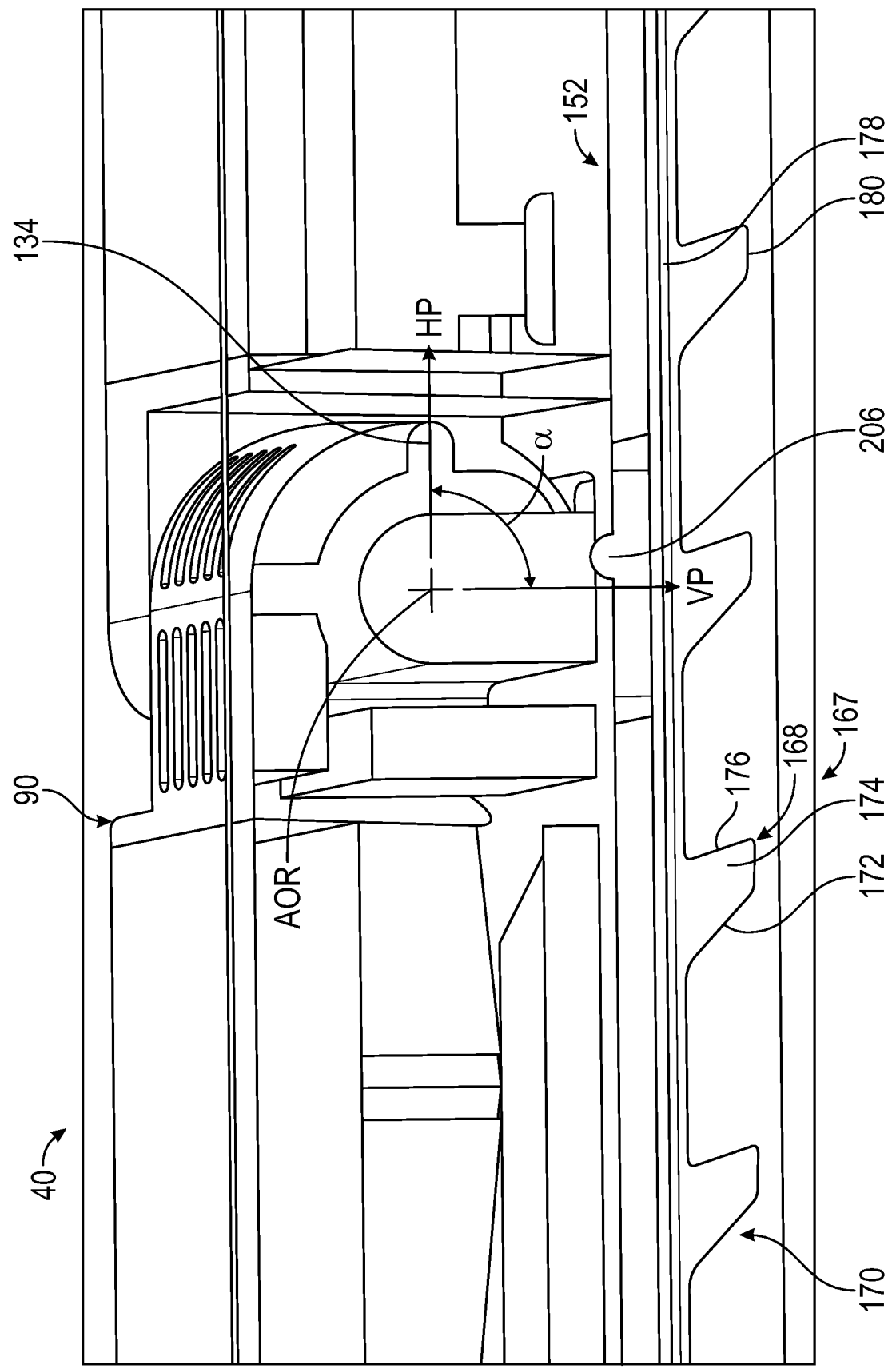
FIG. 2 is a close-up sectional side view of the collapsible cargo organizer of FIG. 1A, taken along line 2-2 of FIG. 1A.

As shown in FIG. 2, rotatable locking nib 134 is in the horizontal position HP with the remainder of rotatable panel 90. When the rotatable panel 90 is rotated about the axis of rotation AOR over rotation angle α towards the vertical position VP, the rotatable locking nib 134 will ultimately physically (interference) contact stationary/fixed locking nib 206, which inhibits the rotatable panel 90 from further free rotation reaching the vertical position VP. At this point, the user of the collapsible cargo organizer must increase the rotational force to rotate the rotatable locking nib 134 past the stationary/fixed locking nib 206 (overcoming the interference), at which point the rotatable panel 90 is locked in the vertical position VP, as the interference of the rotatable locking nib 134 and the stationary/fixed locking nib 206 now inhibits reverse rotation until sufficient rotation force is applied in the opposite rotation direction to rotate the rotatable locking nib 134 once again past the stationary/fixed locking nib 206. Without being bound to a particular theory, when the rotatable locking nib 134 is forced past the stationary/fixed locking nib 206 to overcome the interference, such may result due to deformation (e.g. elastic deformation) of one or more regions of the collapsible cargo organizer 40, such as the rotatable panel 80 (e.g. nib 234) and/or the floor plate 152 (e.g. nib 206). Such may provide an audible indication to the user ("click") to the user that the rotatable panel 90 has attained the locked vertically position VP.

Figure 8A:
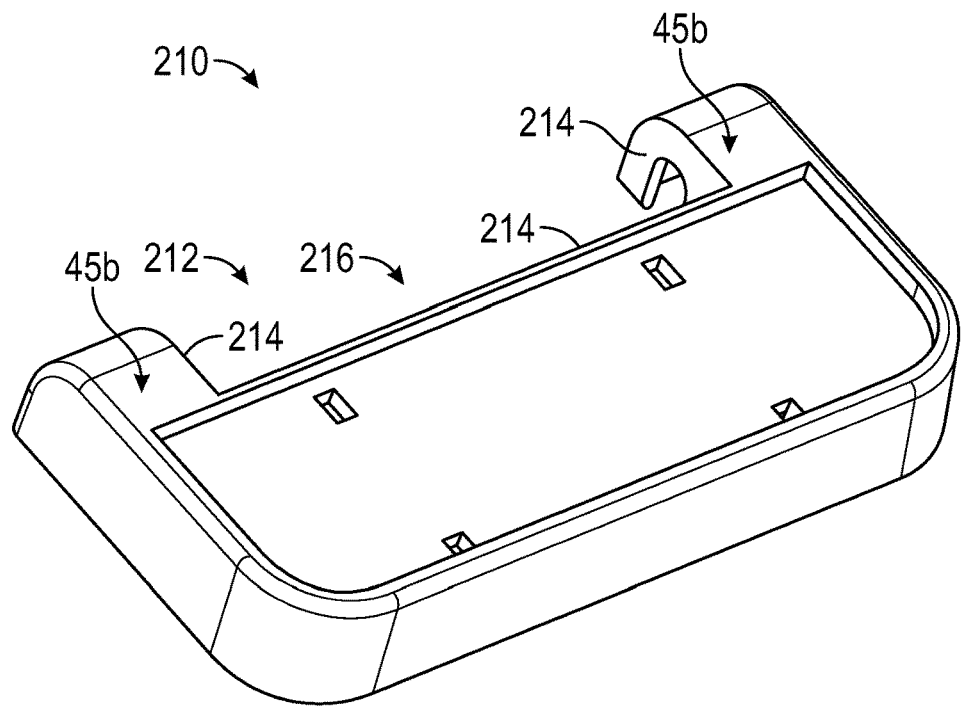
FIG. 8A is an isometric view of a top side of a hinge cover of the collapsible cargo organizer of FIG. 1A, without the applique.
Figure 8B:
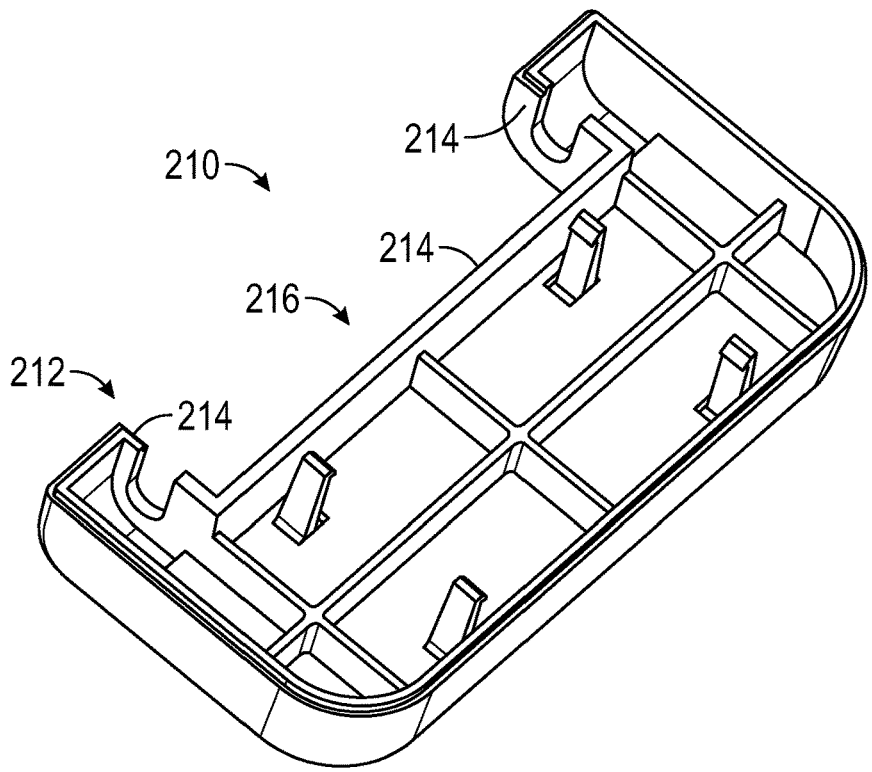
FIG. 8B is an isometric view of a bottom side of the hinge cover of FIG. 8A.
Figure 9A:
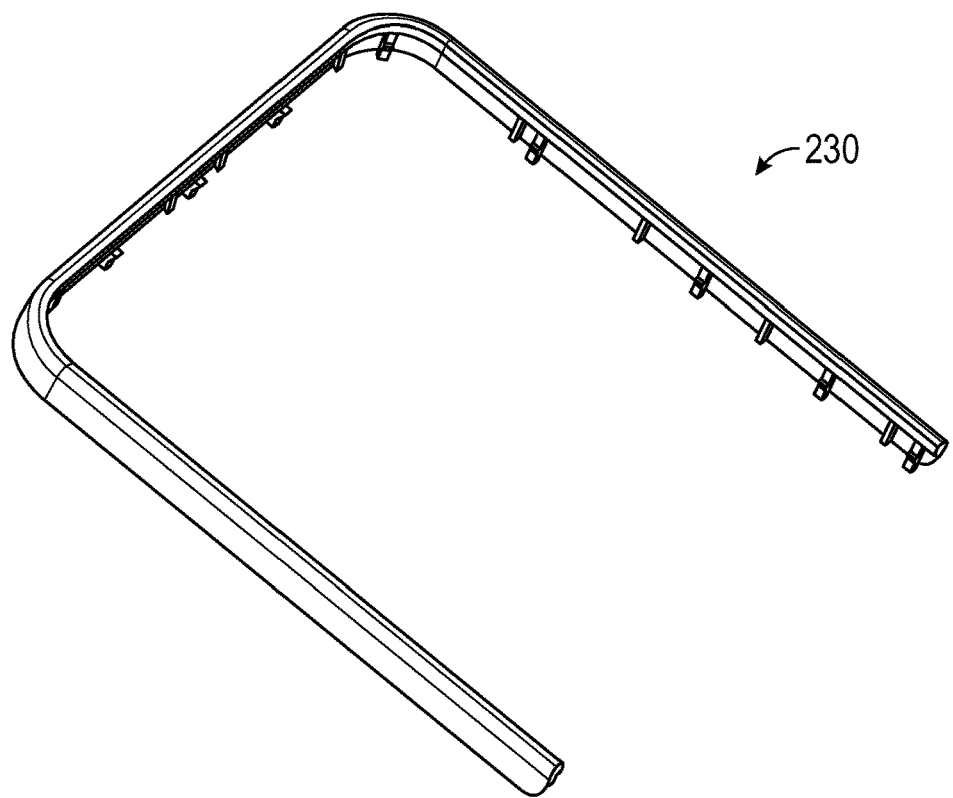
FIG. 9A is an isometric view of a top side of a trim ring of the collapsible cargo organizer of FIG. 1A.
Figure 9B:
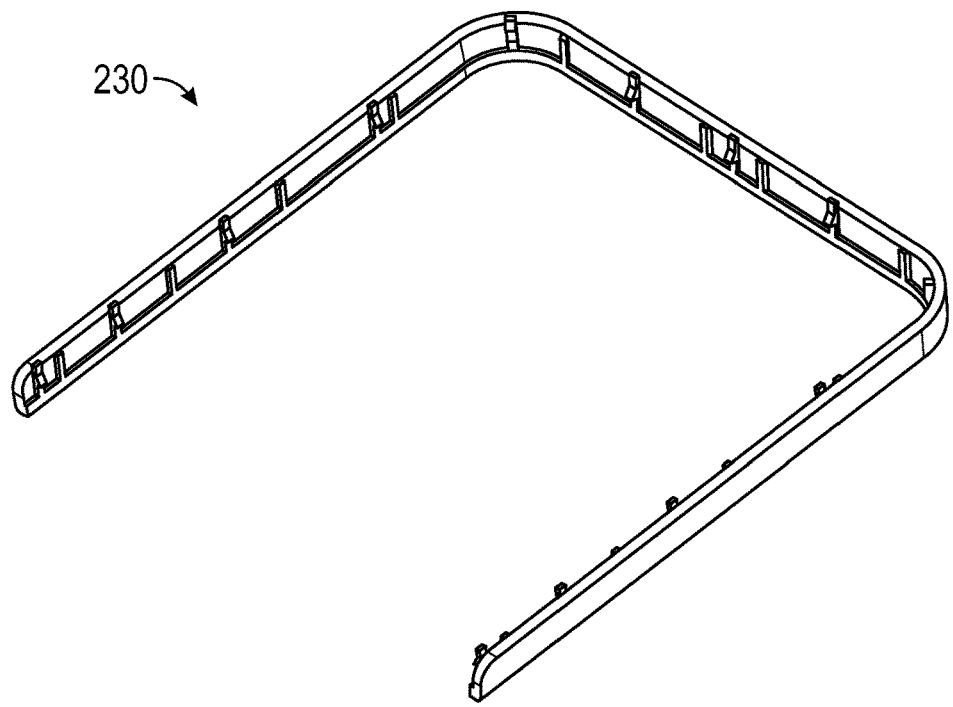
FIG. 9B is an isometric view of a bottom side of the trim ring of FIG. 9A.

As shown in FIGS. 1A-3B and 8A-8B, in order to protect and conceal hinge 80, a trailing end of the collapsible cargo organizer 40, which is opposite the leading or opening end of the collapsible cargo organizer 40, may include a hinge cover 210. Hinge cover 210 mechanically connects to the floor plate 152 of the supporting base 142 in the same manner the back cover 104 of the rotatable panel 90 mechanically connects to the front cover 102 and thus need not be further explained. In FIGS. 8A-8B, the decorative applique 220 (e.g. textile such as carpet or fabric) shown in FIGS. 1A and 3A has been removed from the top (outer) side of the hinge cover 210. Decorative applicate 220 may be attached to the hinge cover 210 with an adhesive (e.g. pressure sensitive, hot melt).

Hinge cover 210 conceals and protects the hinge pins 200, the hinge pin stanchions 202 and the hinge pin receptacles 120. As shown by FIGS. 8A-8B, the hinge cover 210 provides a hinge receptacle 212 which has a receptacle wall 214 in a form of a U-shape defining a recess/cavity 216 to contain hinge 80.

In the foregoing manner, as shown by FIG. 1A, the hinge cover 210 laterally covers the hinge pins 200, the hinge pin stanchions 202 and the hinge pin receptacles 120 at the rear side 60, left side 65 and right side 70 of the collapsible cargo organizer 40, particularly by being disposed out-board of the hinge pins 200, the hinge pin stanchions 202 and the hinge pin receptacles 120 at the rear side 60, left side 65 and right side 70 of the collapsible cargo organizer 40. Stated another way, the hinge pins 200 and the hinge pin stanchions 202 and the hinge pin receptacles 120 are disposed in-board and concealed medially within the collapsible cargo organizer 40, and not at any of the vertical sides (i.e. front, rear, left or right sides 55, 60, 65, and 70), or the horizontal sides (i.e. top or bottom sides 45, 50).

Also, as shown in FIGS. 1A, 3A-3B, the hinge cover 200 inhibits the rotatable panel 90 from being rotated beyond or past an approximately vertical position (e.g. within 1-10 degrees), due to interference contact (mechanical interference) of a top side 45b of the hinge cover 210 with a rear side 110 of the front cover 102. As such, the rotatable panel 90 is inhibited from being broken off if over rotated from the vertical position VP.

As shown in FIGS. 1A-3B and FIGS. 9A-9B, collapsible cargo organizer 40 further comprises replaceable U-shaped perimeter trim ring 230 which is disposed around the top side 45 of the rotatable panel 90 and surrounds a top side 108 of the front cover 208 on the front longitudinal side 55, left lateral side 65 and right lateral side 70. Perimeter trim ring 230 may be replaced in response to damage (e.g. scuffing, marring) associated with use of collapsible cargo organizer 40.

With regards to manufacture, each of the front cover 102, the back cover 104, the floor plate 152, the gripper/underlay 158, the hinge cover 210 and the trim ring 230 may be formed of a single (monolithic) piece of molded plastic, particularly injection molded plastic, respectively. The front cover 102, the back cover 104, the floor plate 152, the gripper/underlay 158, the hinge cover 210 and the trim ring 230 may have a wall thickness in a range of 2-3 mm.

The front cover 102, back cover 104, floor plate 152, hinge cover 210 and trim ring 230 may be formed of a rigid plastic, particularly a thermoplastic composition, to provide suitable stiffness for the collapsible cargo organizer 40. They may be molded-in color and/or painted.

As used herein, a rigid plastic may be understood as a polymer composition which has a three-point bending flexural modulus, as measured in accordance with ASTM D790-10, of at least 150,000 psi, and more particularly at least 200,000 psi. at room temperature (23° C.). More particularly, the polymer composition may have a flexural modulus as measured in accordance with ASTM D-790-10 in a range of 250,000-600,000 psi. at 23° C.

To withstand heat within a motor vehicle, the polymer composition may have a heat distortion temperature as measured in accordance with ASTM D-648-07 of at least 82° C. at 264 psi. More particularly, the polymer composition may have a heat distortion temperature as measured in accordance with ASTM D-648-07 in a range of 82-110° C. at 264 psi.

The rigid polymer composition may comprise, essentially consist of or consist of a thermoplastic polymer such as polypropylene (PP), acrylonitrile-butadiene-styrene (ABS), polycarbonate (PC), polycarbonate/acrylonitrile-butadiene-styrene (PC/ABS) or polyphenylene oxide (PPO).

The gripper/underlay 158 may be formed of a flexible plastic, particularly an elastomer. The elastomer may be formed of any polymer(s), including natural or synthetic polymer(s), and thermoplastic or thermoset polymer(s). Thus, the elastomer may be either a natural or synthetic elastomer, and either a thermoplastic or thermoset elastomer.

As used herein, an elastomer may include any polymer composition with a glass transition temperature Tg below room temperature and which is at most, 50% crystalline (i.e., the composition contains an amorphous phase of 50% or greater, up to 100% amorphous phase). The elastomer may also be characterized as a composition that has an elongation at 23° C. of at least 100%, and which, after being stretched to twice its original length and being held at such for one minute, may recover in a range of 50% to 100% within one minute after release from the stress. More particularly, the elastomer may recover in a range of 75% to 100% within one minute after release from the stress, and even more particularly recover in a range of 90% to 100% within one minute after release from the stress.

The elastomer may also may have a Shore A hardness (ASTM D2240-05 (2010)) of less than 65, including all values and increments therein, including less than 60, less than 50 and less than 40. Furthermore, the elastomer may have a flexural modulus (ASTM D-790-10) of less than 90,000 psi, including all values and increments therein, including less than 80,000 psi, less than 60,000 psi. and less than 40,000 psi.

The elastomer may comprise, essentially consist of or consist of styrene block polymers, such as styrene block copolymers (e.g. styrene-butadiene copolymer) and styrene block terpolymers (e.g. styrene-butadiene-styrene terpolymer, styrene-ethylene/butylene-styrene terpolymer, styrene-ethylene/propylene-styrene terpolymer); polyolefin blends (e.g. polypropylene and ethylene-propylene-diene monomer rubber, polypropylene and nitrile rubber, ethylene-propylene rubber); elastomeric alloys such as melt-processable rubbers and thermoplastic vulcanizates; polyolefins; polyurethanes; polyesters; and rubbers such as natural rubber, neoprene rubber, acrylic rubber, butadiene rubber, butyl rubber, ethylene-propylene rubber, ethylene propylene diene monomer rubber, fluorocarbon rubber, isoprene rubber, nitrile rubber, polyurethane rubber and silicone rubber.

The anchoring mechanism 167 of gripper/underlay 158 (or the floor plate 152) may also comprise other structures such a hook-and-loop fastener, such as a Velcro® hook-and-loop fastener. The hook may be disposed on the collapsible cargo organizer 40. while the loop may be disposed on the supporting structure of the motor vehicle. The loop may also be provided by carpet disposed on the supporting structure of the motor vehicle.

Figure 10A:
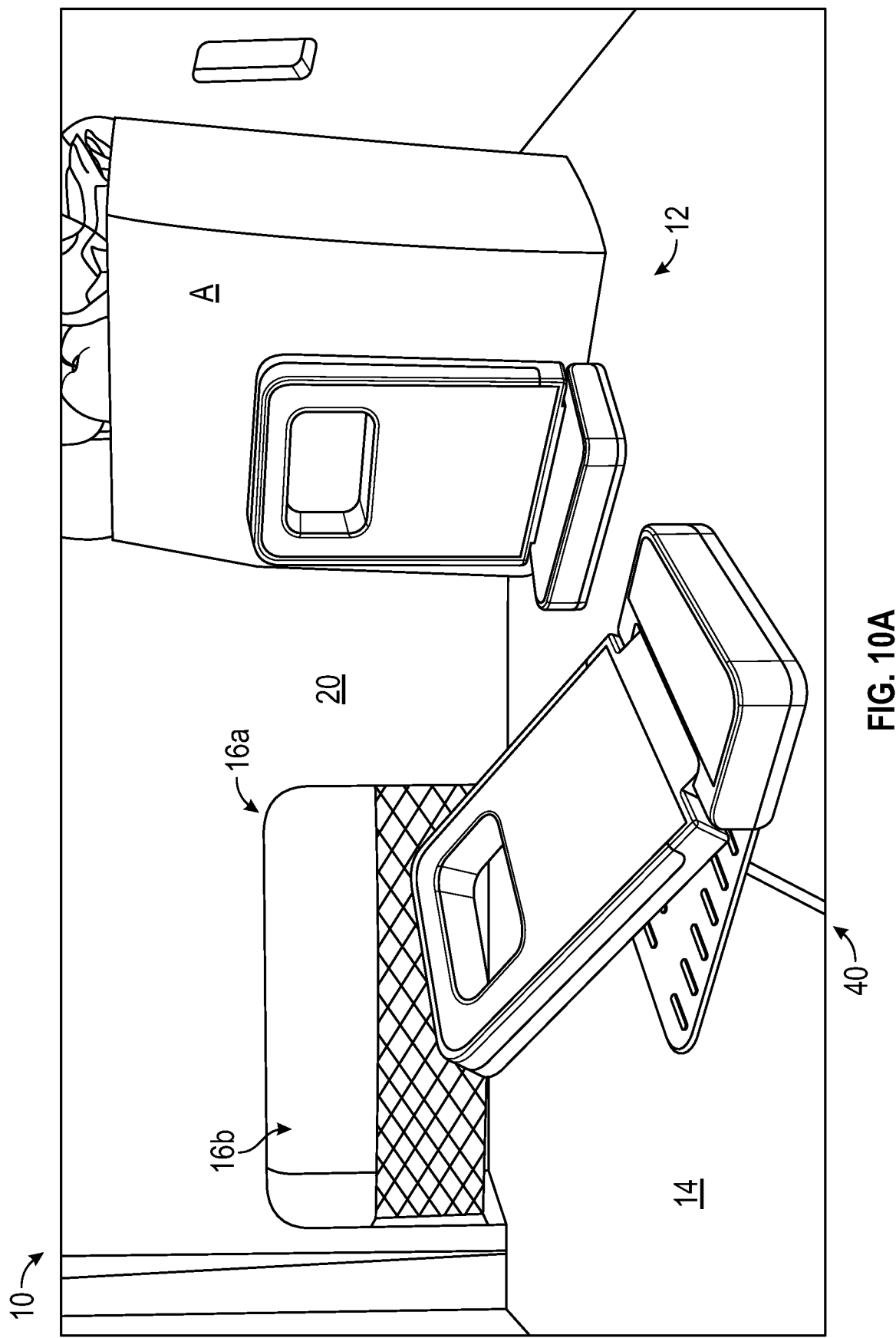
FIG. 10A is an isometric view of a plurality of collapsible cargo organizers of FIG. 1A with a receptacle for a collapsible cargo organizer disposed in a vertical side wall.

Turning to FIG. 10A, there is shown a plurality of collapsible cargo organizers 40 of FIG. 1A in a cargo storage area/compartment 12 of a motor vehicle 10, which is completely enclosed by the motor vehicle 10 and open to the passenger compartment e.g. rearward of the rear seating in a minivan or sport utility vehicle). As shown, the collapsible cargo organizers 40 are disposed on a horizontal supporting structure (e.g. load floor) 14 of the cargo storage area/ compartment 12, which may be provided by a horizontal trim panel/cover. As also shown, the cargo storage area/compartment 12 may include one or more receptacles 16a to contain the collapsible cargo organizers 40. As shown, receptacle 16a comprises a cavity 16b formed in a vertical side wall panel 20 of the cargo storage area/compartment 12, which may be formed in a vertical trim panel/cover, particularly in one-piece with the trim panel/cover as shown. Cavity 16b may be substantially the same size as the collapsible cargo organizer 40 to receive and retain the collapsible cargo organizer 40 therein with an interference fit.

In FIG. 10A, due to the orientation of cavity 16b being arranged to hold/contain the collapsible cargo organizers 40 with their longitudinal axis arranged along the longitudinal direction of the vehicle 10 (i.e. front to rear) when collapsible cargo organizer 40 is disposed therein, the rotatable panel 90 may still be used in the open position, which hinge 80 now arranged vertically rather than horizontally.

Figure 10B:
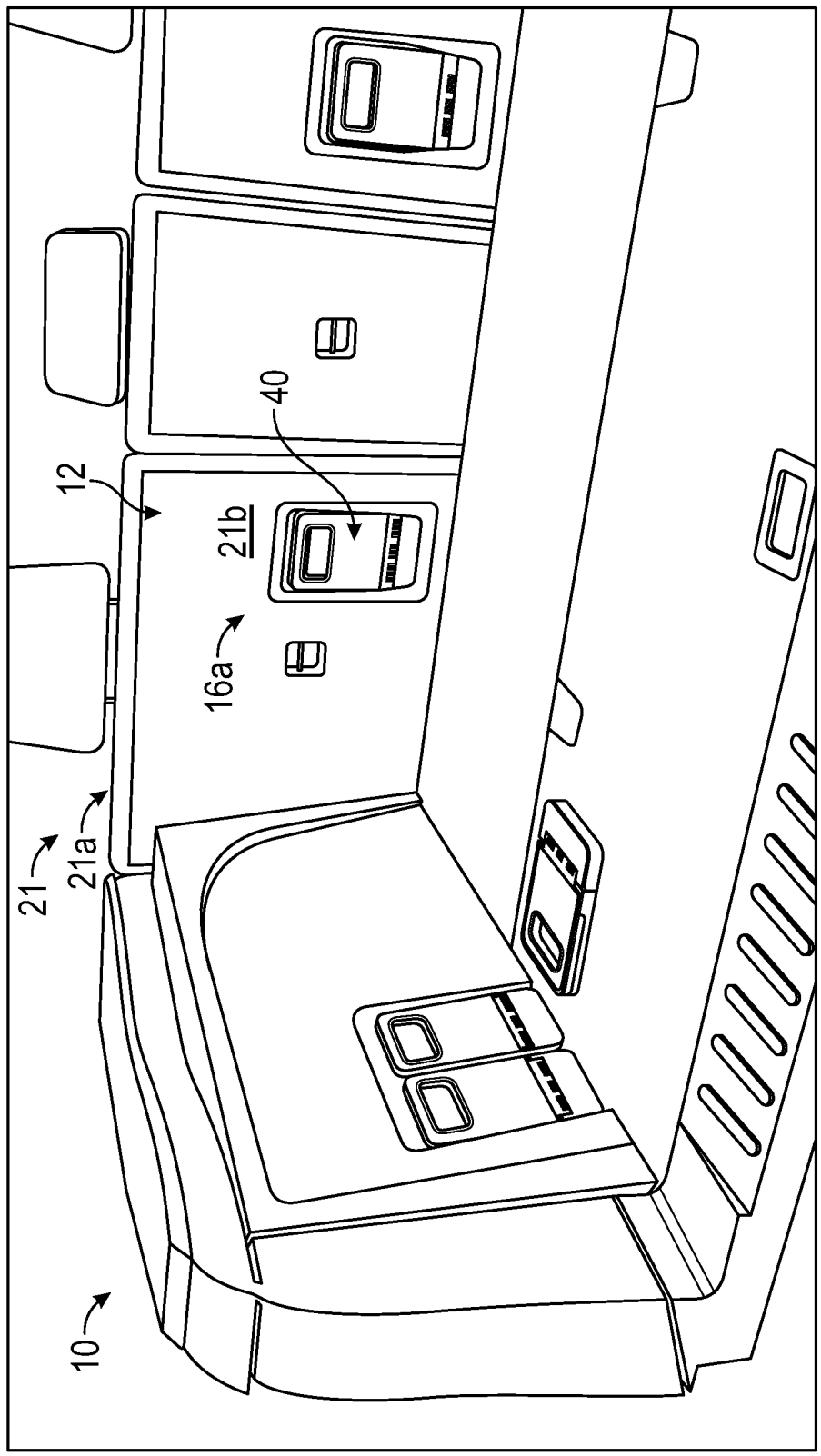
FIG. 10B is an isometric view of a plurality of collapsible cargo organizers of FIG. 1A with respective receptacles for the collapsible cargo organizers disposed in a rear side/seat back of an upper seat member of a vehicle seat.

Referring now to FIG. 10B, there is shown the cargo storage area/compartment 12 of motor vehicle 10 with collapsible cargo organizers 40 and their respective receptacles 16a disposed in a rear side/seat back 21b of upper seat member 21a of vehicle seat 21.

Figure 10C:
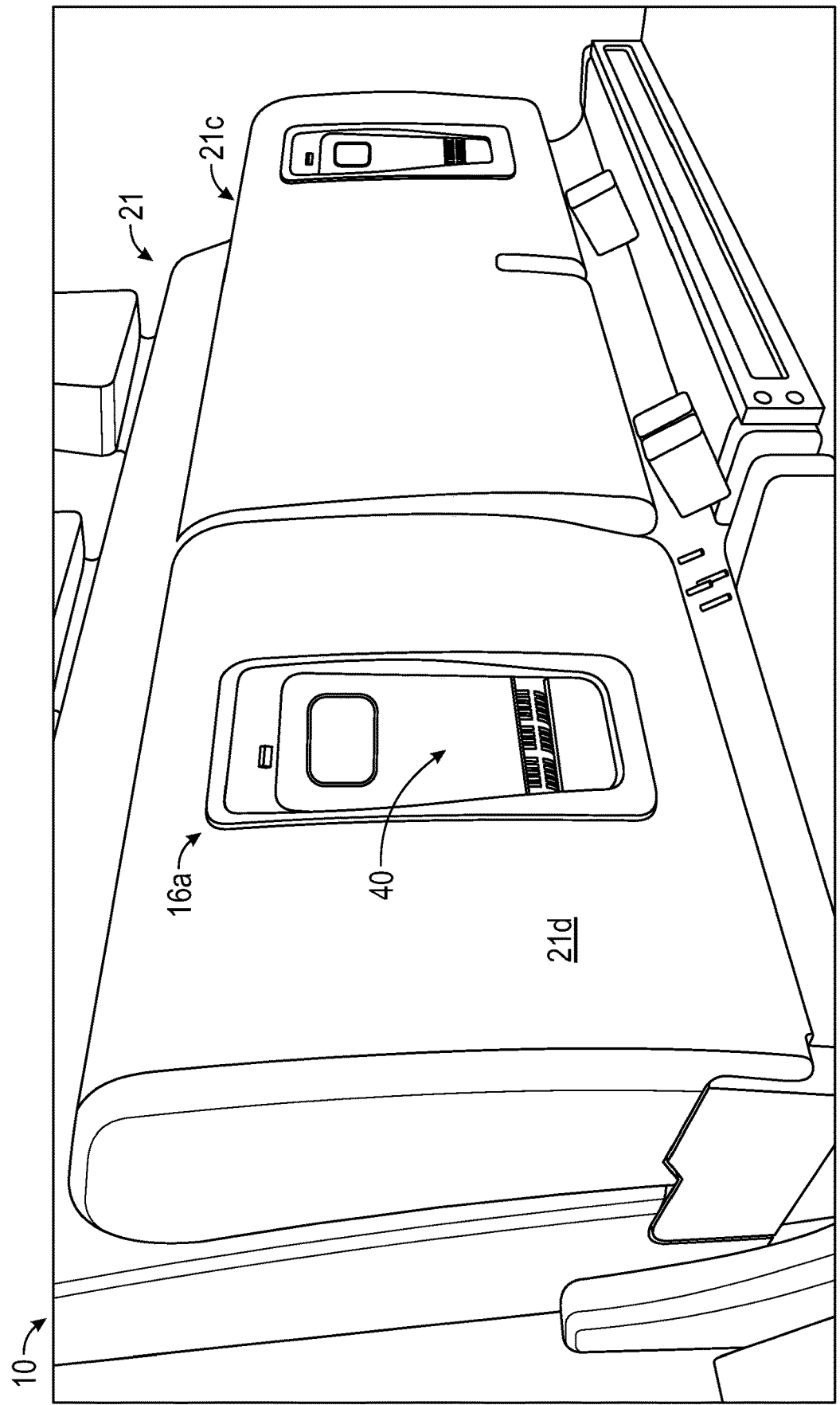
FIG. 10C is an isometric view of a plurality of collapsible cargo organizers of FIG. 1A with respective receptacles for the collapsible cargo organizers disposed in a floor side/seat bottom of a lower seat member of a vehicle seat.

Referring now to FIG. 10C, there is shown vehicle seat 21 of motor vehicle 10 with collapsible cargo organizers 40 and their respective receptacles 16a disposed in a floor side/seat bottom 21d (folded up) of lower seat member 21c of vehicle seat 21. It should be understood that lower seat member 21c of vehicle seat 21 is folded up to expose collapsible cargo organizers 40 and their respective receptacles 16a. However, such will be concealed from view when lower seat member 21c is folded down to the use position.

Figure 10D:
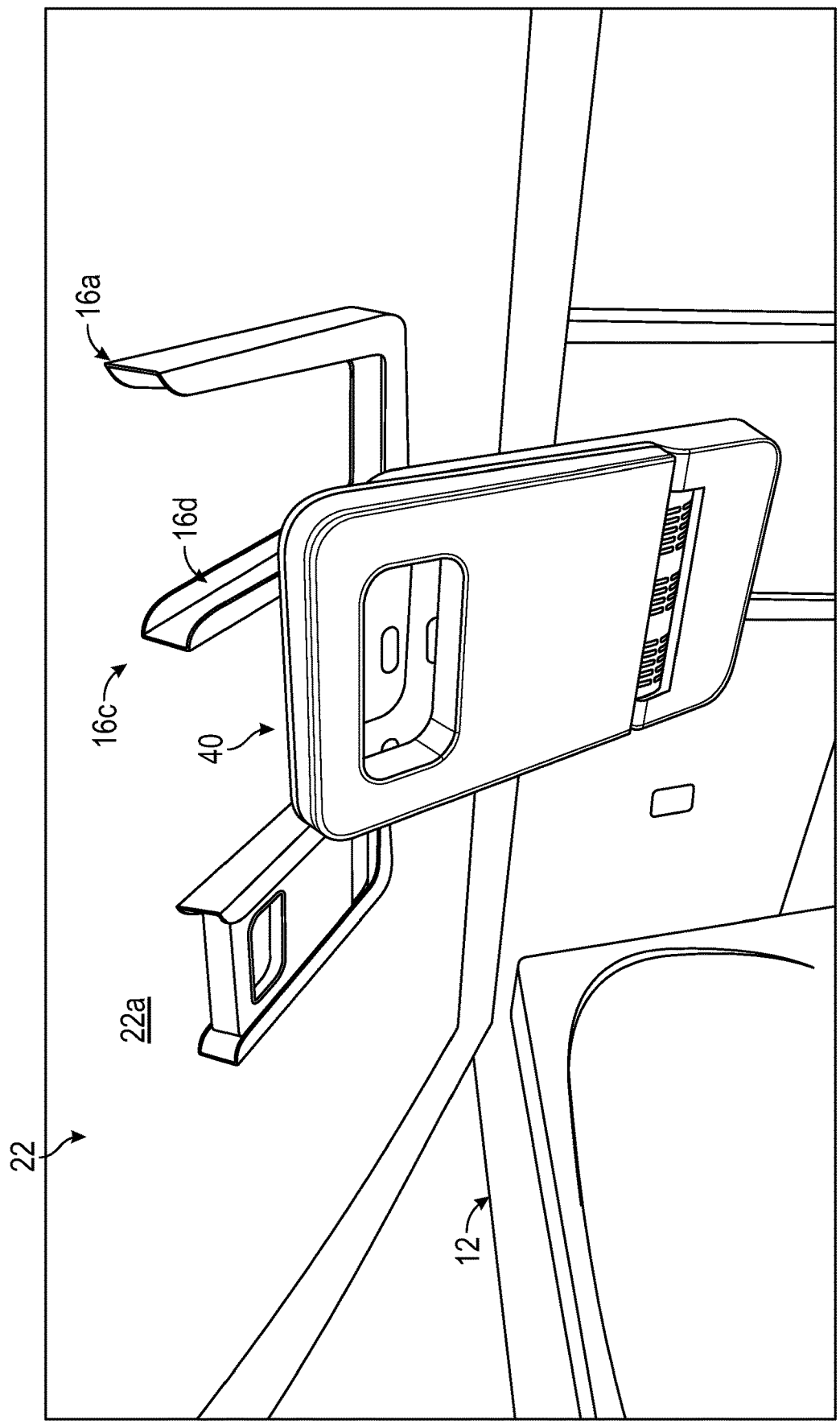
FIG. 10D is an isometric view of a plurality of collapsible cargo organizers of FIG. 1A with respective receptacles for the collapsible cargo organizers disposed at a bottom side of a package/parcel shelf.

Referring now to FIG. 10D, there is shown collapsible cargo organizers 40 and their respective receptacles 16a disposed at a bottom side 22a of a motor vehicle package/parcel shelf 22, which functions as a cover for the cargo storage area/compartment 12 within motor vehicle 10, and which small packages/parcels may be disposed thereon. As shown, receptacles 16a comprise a U-shaped frame 16c having a U-shaped channel 16d.

Figure 10E:
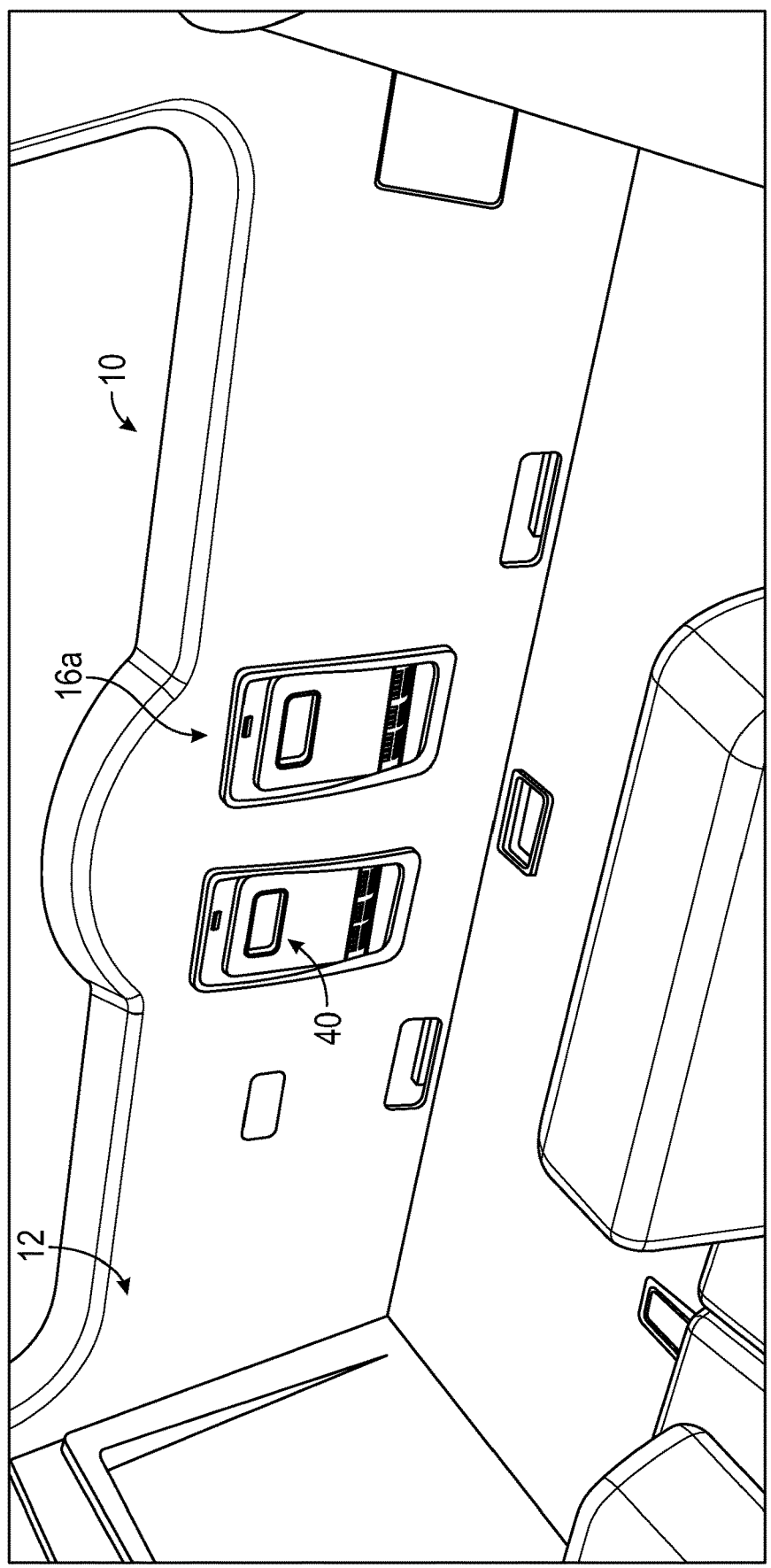
FIG. 10E is an isometric view of a plurality of collapsible cargo organizers of FIG. 1A with respective receptacles for the collapsible cargo organizers disposed in a rear hatch/tail gate/rear door.

Referring now to FIG. 10E, there is shown collapsible cargo organizers 40 and their respective receptacles 16a disposed in a rear hatch/tail gate/rear door 23 of motor vehicle 10.

Figure 10F:
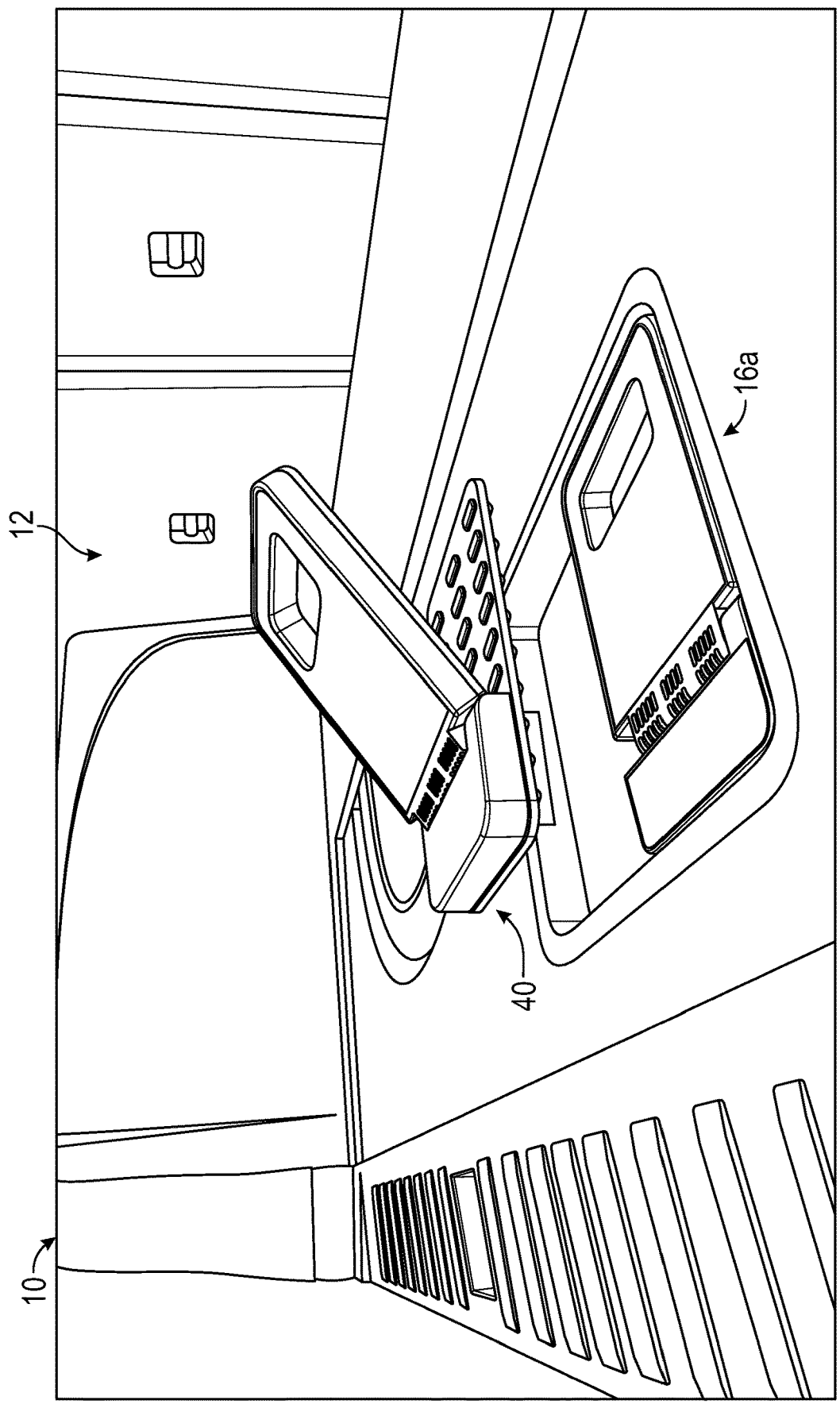
FIG. 10F-10G are isometric views of a plurality of collapsible cargo organizers of FIG. 1A with respective receptacles for the collapsible cargo organizers disposed in a load floor/platform.
Figure 10G:
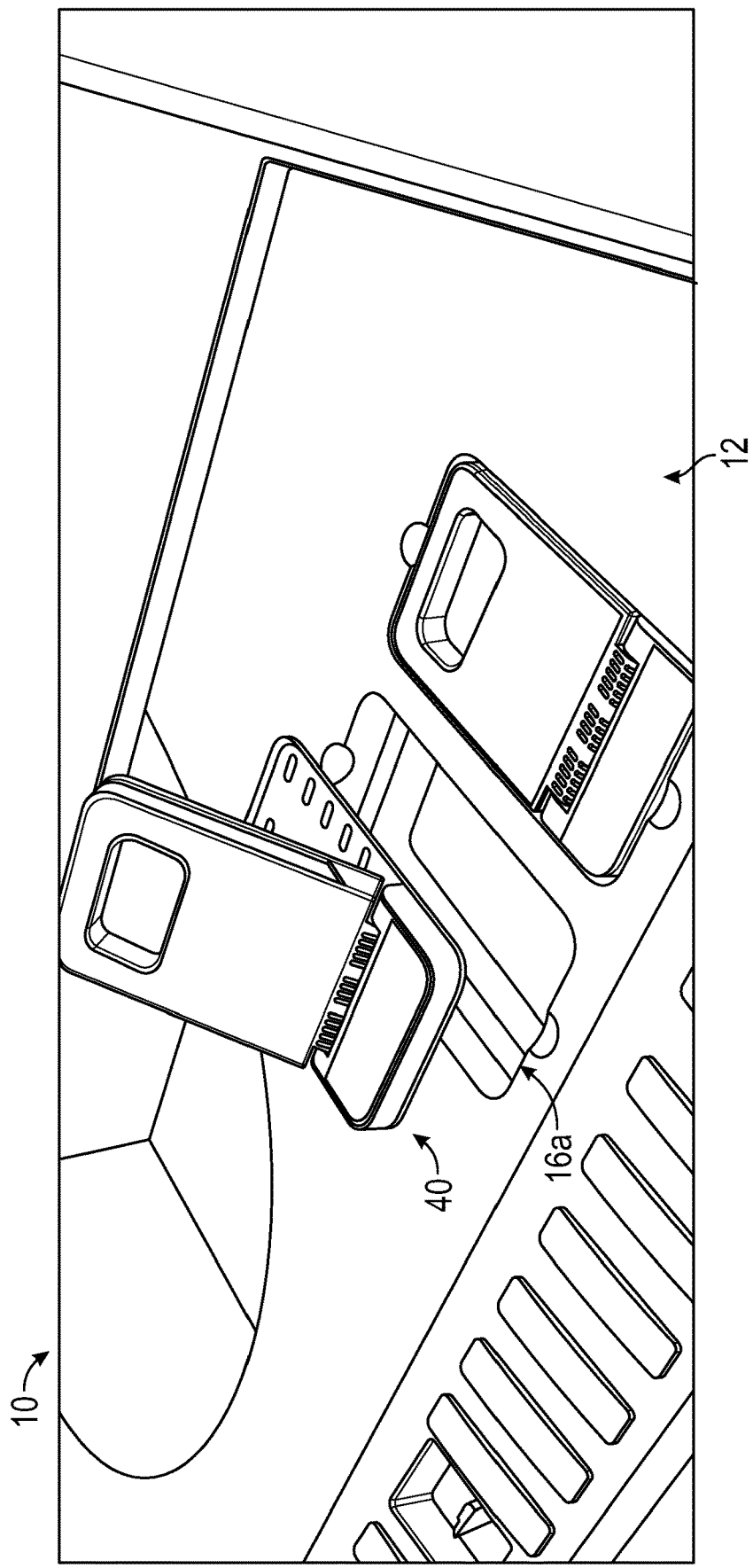

Referring now to FIGS. 10F and 10G, here is shown collapsible cargo organizers 40 and their respective receptacles 16a disposed in a load floor/platform 24 at the bottom of cargo storage area/compartment 12 of motor vehicle 10.

Figure 10H:
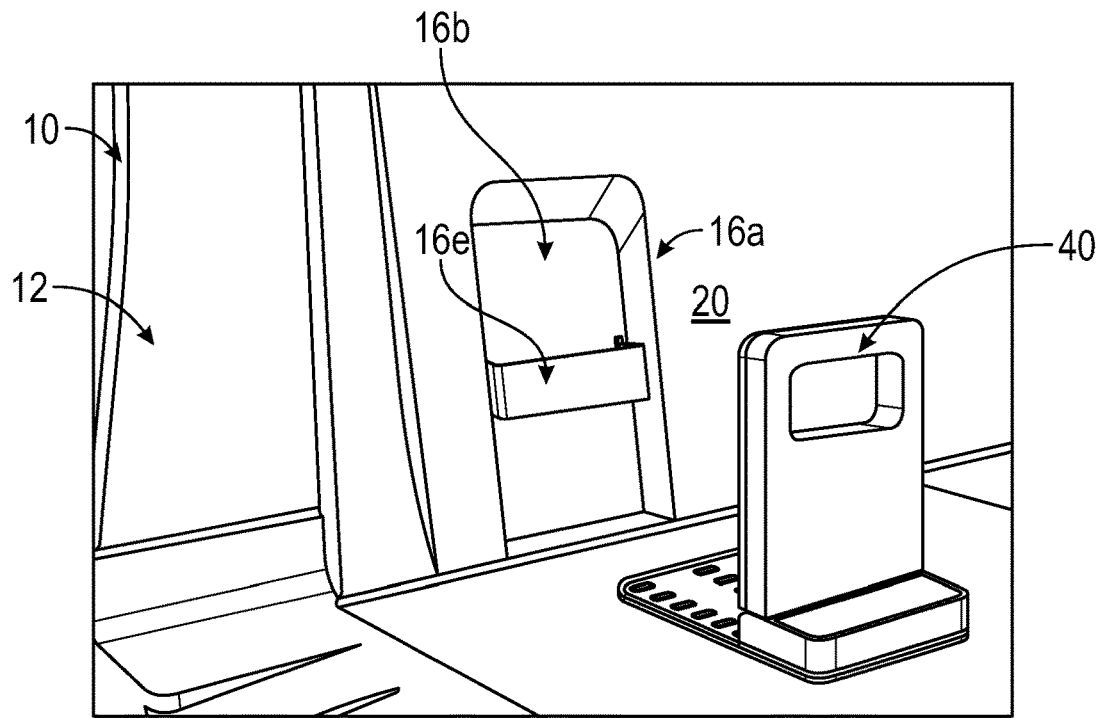
FIG. 10H-10I are isometric views of a collapsible cargo organizer of FIG. 1A with a respective receptacle for the collapsible cargo organizer disposed in a vertical side wall.
Figure 10I:
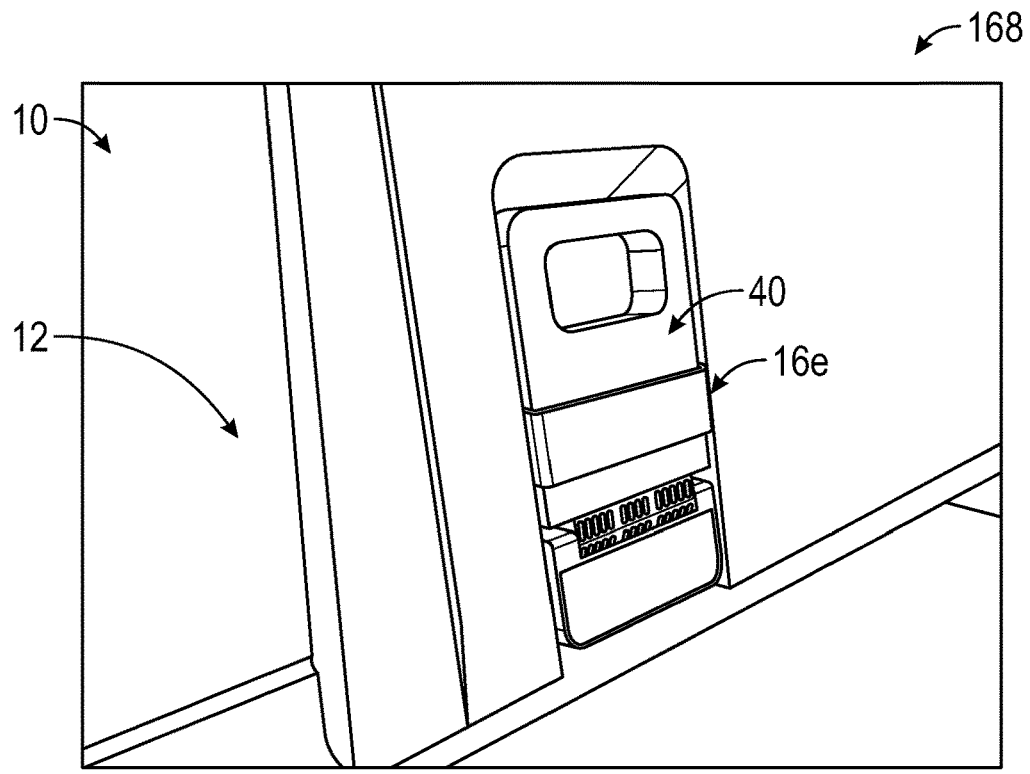

Referring now to FIGS. 10H and 10I, there is shown collapsible cargo organizer 40 and its respective receptacle 16a comprising a cavity 16b formed in a vertical side wall panel 20 of the cargo storage area/compartment 12, which may be formed in a vertical trim panel/cover, particularly in one-piece with the trim panel/cover, shown as an interior quarter panel. As shown, the receptacle 16a may include a retaining (cross) strap 16e to retain collapsible cargo organizer 40 with receptacle 16a.

Figure 10J:
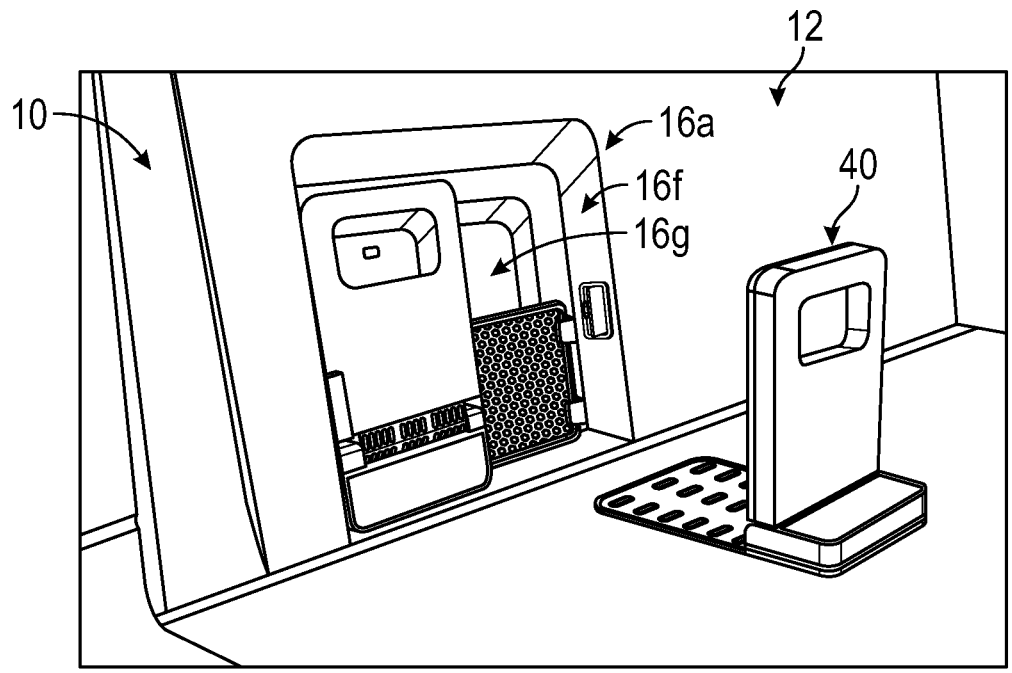
FIG. 10J-10K are isometric views of a plurality of collapsible cargo organizers of FIG. 1A with respective receptacles for the collapsible cargo organizers disposed in a vertical side wall.
Figure 10K:
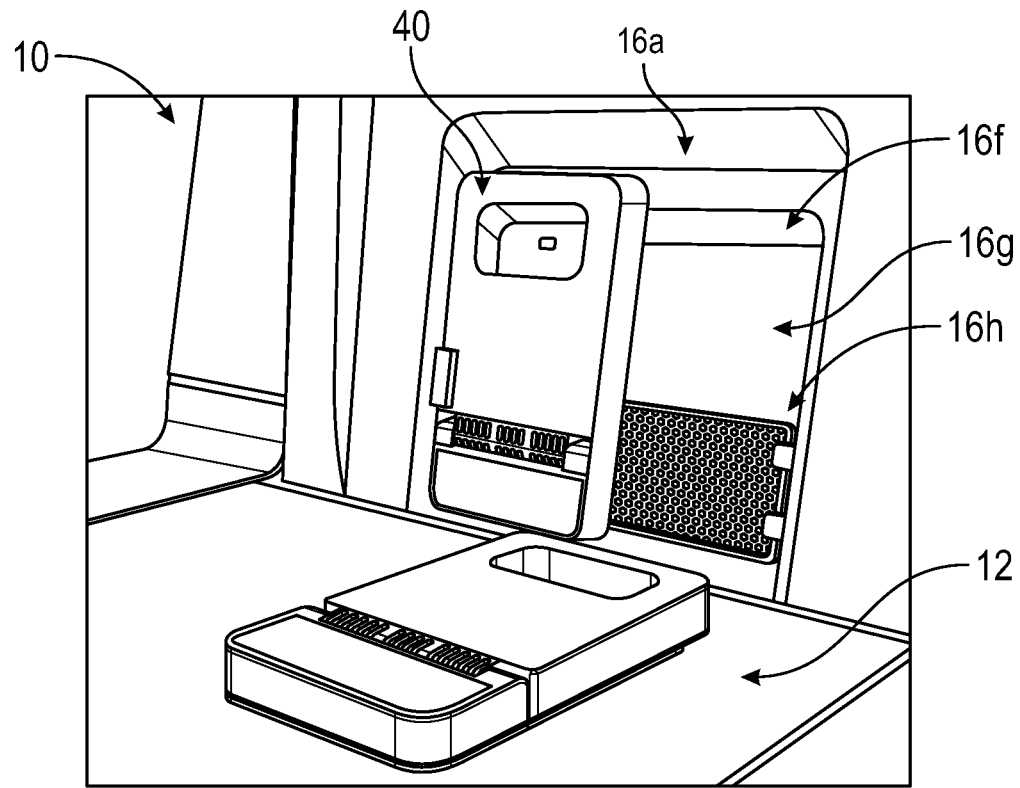

Referring now to FIGS. 10J and 10K, there is shown collapsible cargo organizers 40 and their respective receptacles 16a comprising a cavity 16b formed in a vertical side wall panel 20 of the cargo storage area/compartment 12, which may be formed in a vertical trim panel/cover, shown as an interior quarter panel. As shown, in addition to cavity 16b having a cavity section 16f configured to receive and retain the collapsible cargo organizers 40, cavity 16b has a cavity section 16g disposed behind collapsible cargo organizers 40 for storage/concealing of articles. As shown, cavity section 16f and cavity section 16h are partially separated by a dividing/retaining member 16h, which is a rigid panel, which acts to retain articles in cavity section 16g, particularly when collapsible cargo organizers 40 are removed from cavity section 16f.

Figure 10L:
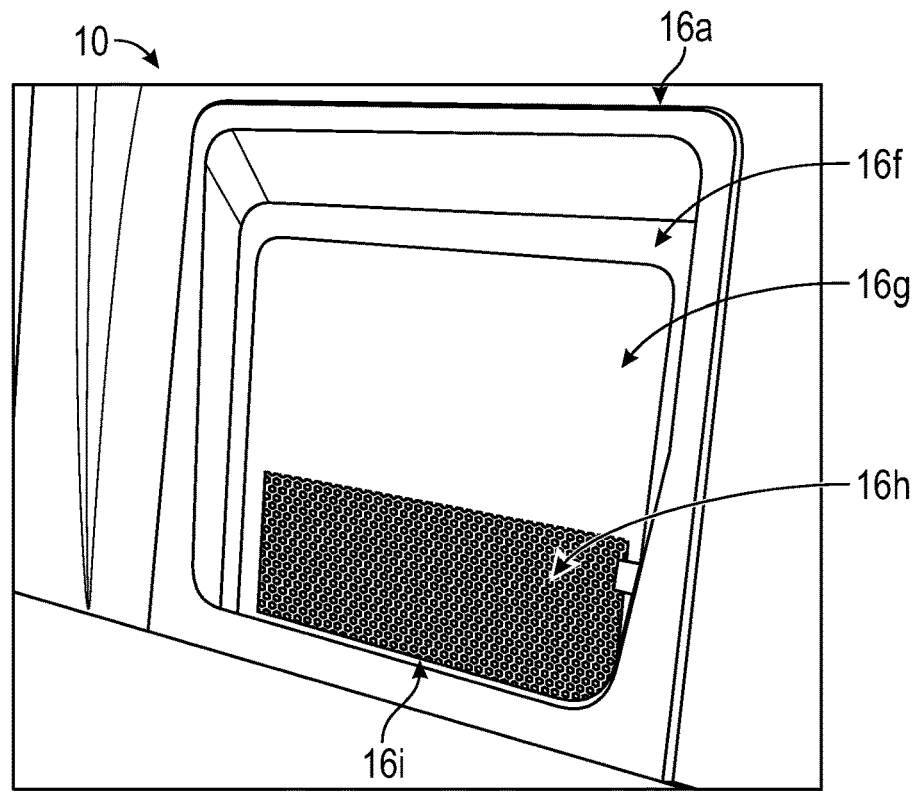
FIG. 10L-10M are isometric views of a plurality of collapsible cargo organizers of FIG. 1A with respective receptacles for the collapsible cargo organizers disposed in a vertical side wall.
Figure 10M:
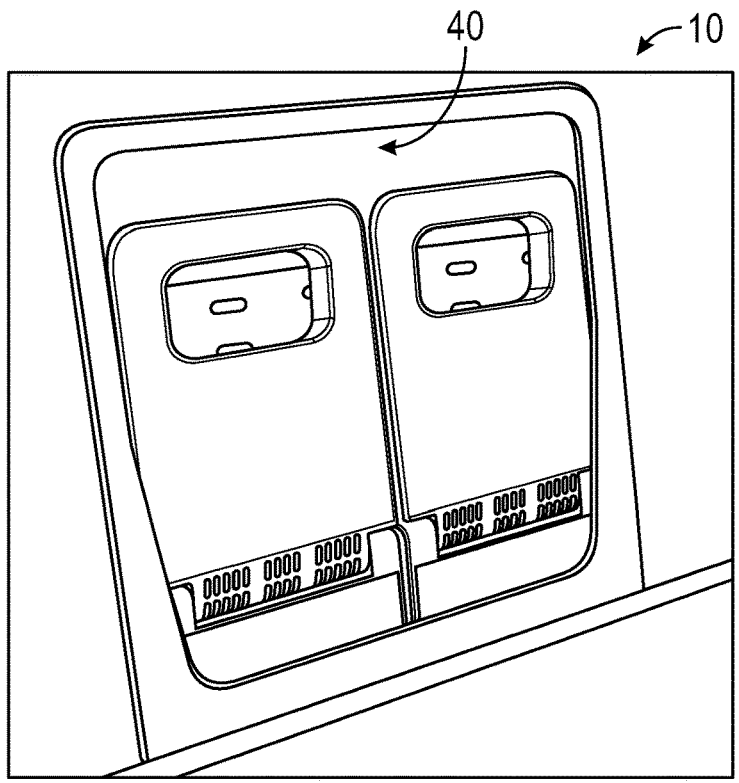

Referring now to FIGS. 10L and 10M, receptacle 16a may be a plastic molding which formed as a separate molding which is added to the vertical side wall panel 20 of the cargo storage area/compartment 12. Receptacle 16a may be added to vertical side wall panel 20 of the cargo storage area/compartment 12 when the vertical side wall panel 20 is manufactured, or as an after-market addition (add-on or retro-fit) to the vertical side wall panel 20 after vehicle manufacture. As shown, similar to the receptacle 16a of FIGS. 10J and 10K, the receptacle 16a of FIGS. 10L and 10M has cavity section 16f and cavity section 16h which are partially separated by a dividing/retaining member 16h, which is a flexible netting/mesh. In addition, receptacle 16a has a perimeter retaining lip 16i around a bottom portion of cavity section 16f which creates an undercut/trough at the bottom of the receptacle 16a. As such when collapsible cargo organizer 40 is disposed in cavity section 16f, and more particularly within undercut/trough at the bottom of the receptacle 16a, the perimeter retaining lip 16i around the bottom portion of cavity section 16f only permits the collapsible cargo organizers 40 to be removed from cavity section 16f if it is first moved vertically as to clear the perimeter retaining lip 16i.

Figure 10N:
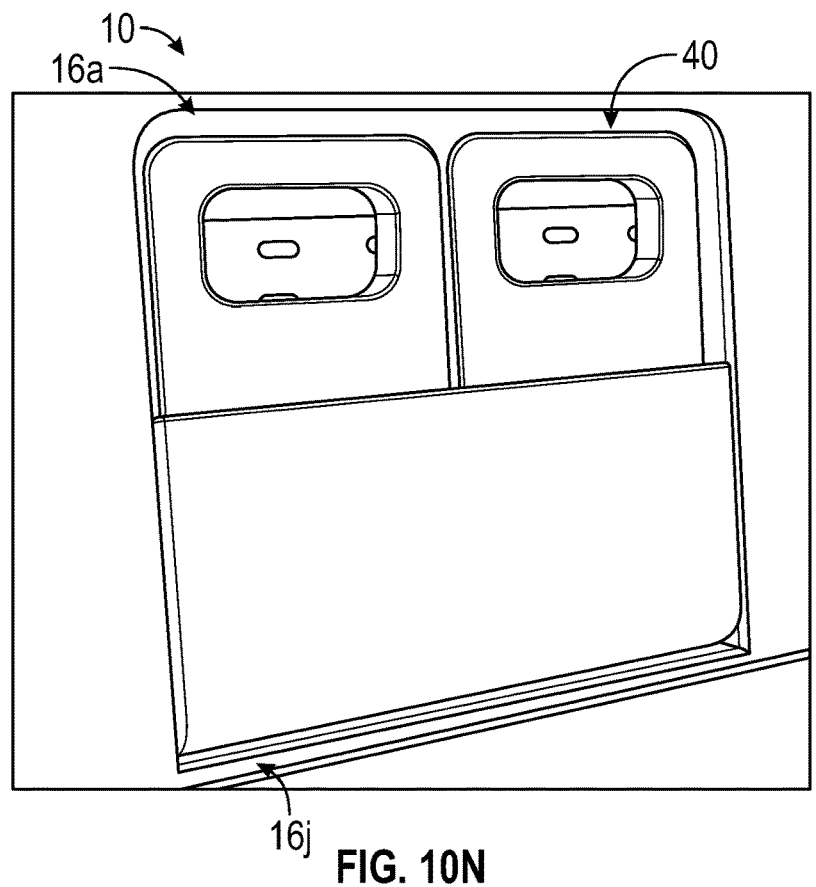
FIG. 10N-10P are isometric views of a plurality of collapsible cargo organizers of FIG. 1A with respective receptacles for the collapsible cargo organizers disposed in a vertical side wall.
Figure 10O:
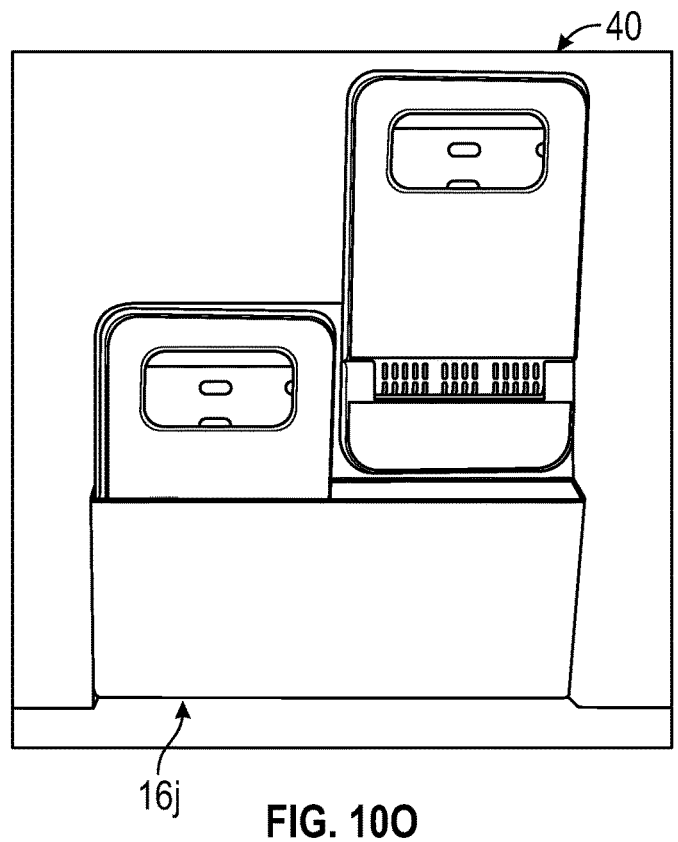
Figure 10P:
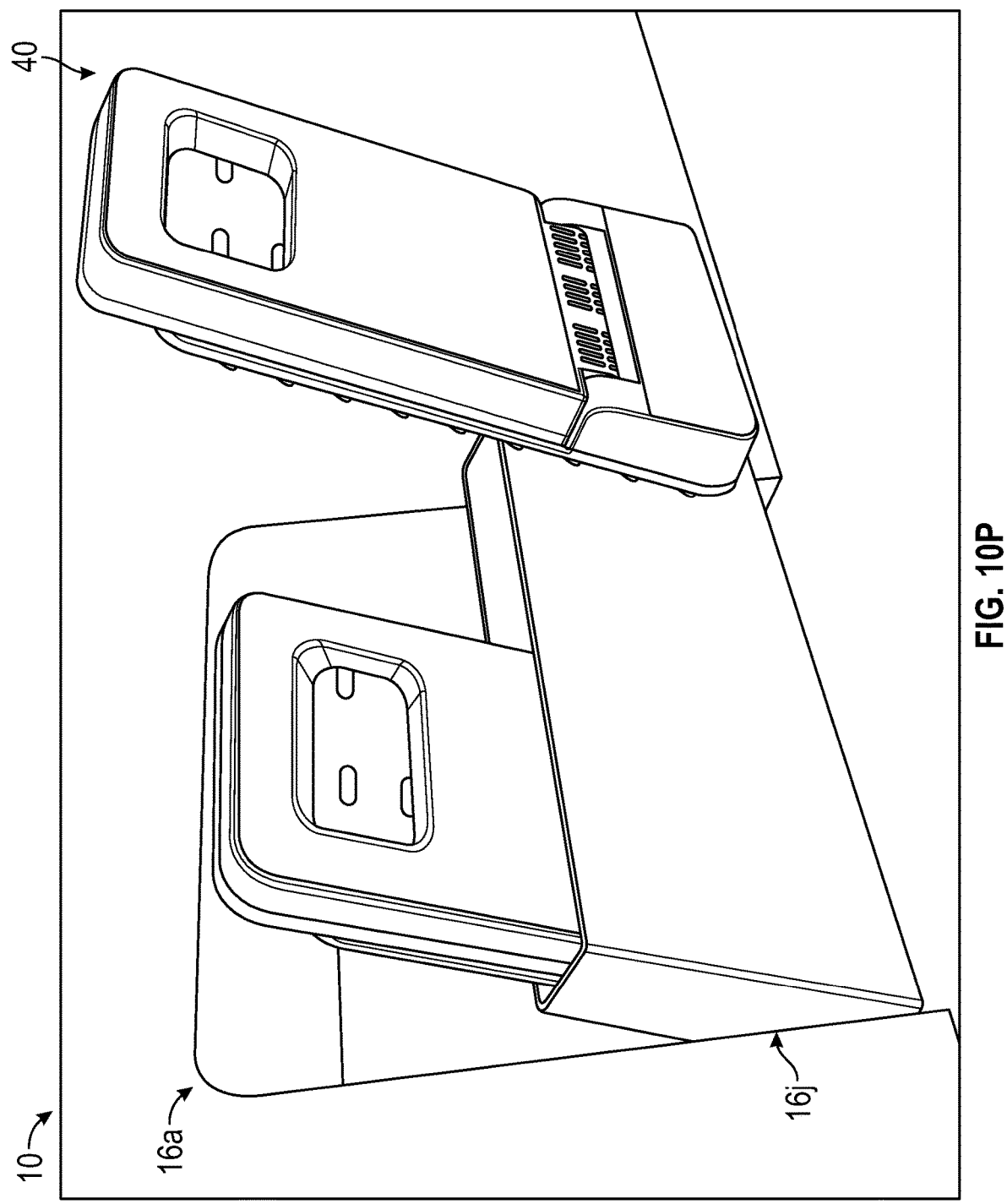

Referring now to FIGS. 10N-10P, receptacle 16a may comprise a tilt bin 16j which holds collapsible cargo organizers 40 and is tiltable about an axis at an angle in a range of 10-45 degrees to present the collapsible cargo organizers 40 when opened to the opened position (FIGS. 10O-10P) from the closed position (FIG. 10N).

Referring now to FIGS. 11A, there is show another embodiment of a collapsible cargo organizer 40 according to the present disclosure. As shown in FIG. 11A, the applique 114 of the rotatable panel front cover 102 and applique 230 of the hinge cover 210 have both been eliminated to simplify the collapsible cargo organizer 40. Furthermore, as show in FIGS. 11A and 11B, the trim ring 230 has also been eliminated, having been integrated with the rotatable panel front cover 102 as a single-piece (monolithic) molding.

The appliques 114, 230 and the trim ring 230 may be used in various combinations to provide variants of the collapsible cargo organizer 40 (e.g. low product line, intermediate product line, high product line). For example, the low product line may not include either of the appliques 114, 230 or the trim ring 230, the intermediate product line made add the appliques 114, 230, and the high product line may further add the trim ring 230.

Referring to FIG. 11C, the reinforcing structure 112 is arranged at the inside of the bottom cover 104 in contrast to the embodiment of FIG. 1A. Also, in contrast to the embodiment of FIG. 1A, the enclosed collar 96 defining the handle opening 94 is now arranged on the bottom cover 104 rather than the front cover 102. Also as shown in FIG. 11C, the rear side 110 and hinge pin receptacles 120 of the front cover 102 are now arranged on the bottom cover 104 rather than the front cover 102.

In other embodiments, the hinge pin receptacles 120 may be provided as part of the floor plate 152, while the hinge pins 200 may be provided as part of the front cover 102 or the back cover 104 of the rotatable panel 90.

While a preferred embodiment of the present invention(s) has been described, it should be understood that various changes, adaptations and modifications can be made therein without departing from the spirit of the invention(s) and the scope of the appended claims. The scope of the invention(s) should, therefore, be determined not with reference to the above description, but instead should be determined with reference to the appended claims along with their full scope of equivalents. Furthermore, it should be understood that the appended claims do not necessarily comprise the broadest scope of the invention(s) which the applicant is entitled to claim, or the only manner(s) in which the invention(s) may be claimed, or that all recited features are necessary.

LISTING OF REFERENCE CHARACTERS 10 motor vehicle
12 motor vehicle cargo storage area/compartment
14 motor vehicle horizontal supporting/structure load floor
16a motor vehicle cargo organizer receptacle
16b motor vehicle cargo organizer receptacle cavity
16c motor vehicle cargo organizer receptacle U-shaped frame
16d motor vehicle cargo organizer receptacle U-shaped frame U-shaped channel
16e motor vehicle cargo organizer receptacle retaining (cross) strap
16f motor vehicle cargo organizer receptacle cavity section
16g motor vehicle cargo organizer receptacle cavity section
16h motor vehicle cargo organizer receptacle cavity dividing/retaining member.
16i motor vehicle cargo organizer receptacle retaining lip
16j motor vehicle cargo organizer receptacle tilt bin
20 motor vehicle vertical side wall panel
21 motor vehicle seat
21a motor vehicle upper seat member
21b motor vehicle upper seat member rear side/seat back
21c motor vehicle lower seat member
21d motor vehicle lower seat member floor side/seat bottom
22 motor vehicle package/parcel shelf
22a motor vehicle package/parcel shelf bottom side
23 motor vehicle rear hatch/tail gate/rear door
24 motor vehicle load floor/platform
40 collapsible cargo organizer
45 collapsible cargo organizer/rotatable panel top side
50 collapsible cargo organizer bottom side
55 collapsible cargo organizer front longitudinal (opening/closing) side
60 collapsible cargo organizer rear longitudinal side
65 collapsible cargo organizer left lateral side
70 collapsible cargo organizer right lateral side
80 collapsible cargo organizer hinge
90 rotatable panel
92 handle
94 handle opening
96 handle collar
98 rotatable panel bottom side
102 rotatable panel front cover
104 rotatable panel back cover
106 rotatable panel inner cavity
108 rotatable panel front cover top side
110 rotatable panel front cover rear side
112 rotatable panel front cover reinforcement structure
114 rotatable panel front cover applique
118 rotatable panel back cover applique
120 rotatable panel front cover hinge pin receptacle
122 rotatable panel front cover hinge pin receptacle wall
124 rotatable panel front cover hinge pin receptacle recess/cavity
126 rotatable panel front cover hinge pin receptacle detent
128 rotatable panel front cover hook engagement receptacle
130 rotatable panel front cover hook engagement receptacle window
132 rotatable panel front cover hook engagement receptacle engagement lip
134 rotatable panel front cover locking nib
140 rotatable panel back cover engagement hook
142 supporting base
144 supporting base front end
146 supporting base rear end
152 supporting base floor plate
154 supporting base floor plate base panel
156 supporting base floor plate base panel top side
158 supporting base gripper/underlay
160 supporting base gripper/underlay top side (upward) projection
162 supporting base gripper/underlay top side (upward) projection head
164 supporting base gripper/underlay top side (upward) projection engagement undercut
166 supporting base gripper/underlay top side (upward) projection neck
167 anchoring mechanism
168 supporting base gripper/underlay bottom side (downward) projection
170 supporting base gripper/underlay bottom side (downward) projection front end
172 supporting base gripper/underlay bottom side (downward) projection front/leading edge
174 supporting base gripper/underlay bottom side (downward) projection sides (174a, 174b, 174c)
176 supporting base gripper/underlay bottom side (downward) projection rear end
178 supporting base gripper/underlay bottom side (downward) projection proximal end
180 supporting base gripper/underlay bottom side (downward) projection distal end
182 supporting base gripper bumper
184 supporting base floor plate panel gripper/underlay receptacle
186 supporting base floor plate panel gripper/underlay receptacle window
188 supporting base floor plate panel gripper/underlay receptacle engagement lip
190 supporting base floor plate end
200 supporting base floor plate hinge pin
202 supporting base floor plate hinge pin stanchion
204 supporting base floor plate hinge pin detent receptacle
206 supporting base floor plate locking nib
210 hinge cover
212 hinge cover hinge receptacle
214 hinge cover hinge receptacle wall
216 hinge cover hinge receptacle recess/cavity
220 hinge cover applique
230 trim ring
αa rotation angle
A article
ACS article containing space
AOR axis of rotation
FL forward length
HP horizontal position LD longitudinal direction
PL parting line
RL rearward length
T thickness
TD transverse direction
VD vertical direction
VP vertical position
WD width direction

What is claimed is:

1. A collapsible cargo organizer, comprising:
a rotatable panel comprising a front cover and a back cover;
a supporting base comprising a floor plate;
wherein the rotatable panel is rotatable from a horizontal position to a vertical position and vice-versa;
wherein, when the rotatable panel is in the vertical position, the rotatable panel provides a vertical panel to laterally support at least one article placeable in an article containing space of the collapsible cargo organizer which overlies the floor plate of the supporting base; and
wherein the floor plate of the supporting base overlied by the article containing space when the rotatable panel is in the vertical position is covered by the rotatable panel when the rotatable panel is in the horizontal position.

2. The collapsible cargo organizer of claim 1, further comprising:
an applique;
the rotatable panel comprises a top side and a bottom side; and
the applique is disposed on at least one of the top side or the bottom side of the rotatable panel.

3. The collapsible cargo organizer of claim 1, wherein:
the rotatable panel is a hollow panel with an inner cavity disposed between the front cover and the back cover.

4. The collapsible cargo organizer of claim 1, further comprising:
a hinge;
the collapsible cargo organizer has a front side, a rear side, a left side and a right side;
the rotatable panel is rotatable from a horizontal position to a vertical position and vice-versa about the hinge; and
the hinge is disposed in-board of the front side, the rear side, the left side and the right side of the collapsible cargo organizer.

5. The collapsible cargo organizer of claim 1, further comprising:
a hinge;
a hinge cover comprising a hinge receptacle;
the hinge disposed in the hinge receptacle;
the collapsible cargo organizer has a front side, a rear side, a left side and a right side; and
the hinge cover is disposed out-board of the hinge at the rear side, the left side and the right side of the collapsible cargo organizer.

6. The collapsible cargo organizer of claim 1, wherein:
the supporting base includes a plurality of upwardly directed gripper projections connected to the floor plate and a plurality of downwardly directed gripper projections connected to the floor plate.

7. The collapsible cargo organizer of claim 6, wherein:
the plurality of upwardly directed gripper projections extend through an opening in the floor plate from beneath the floor plate.

8. The collapsible cargo organizer of claim 1, further comprising:
a releasable catch mechanism which releasably retains the rotatable panel in the vertical position.

9. The collapsible cargo organizer of claim 8, wherein:
the releasable catch mechanism comprises at least one detent and at least one detent receptacle, wherein the at least one detent occupies the at least one detent receptacle when the rotatable panel is in the vertical position.

10. The collapsible cargo organizer of claim 1, wherein:
the rotatable panel and the floor plate form a hinge of the collapsible cargo organizer; and
the rotatable panel is rotatable from the horizontal position to the vertical position and vice-versa via the hinge.

11. The collapsible cargo organizer of claim 10, wherein:
the hinge is formed solely by the rotatable panel and the floor plate.

12. The collapsible cargo organizer of claim 10, wherein:
the hinge comprises at least one hinge pin and at least one hinge pin receptacle.

13. The collapsible cargo organizer of claim 12, wherein:
the floor plate comprises the at least one hinge pin; and
the rotatable panel comprises the at least one hinge pin receptacle.

14. The collapsible cargo organizer of claim 1, wherein:
the front cover and the back cover are formed as distinct components which are mechanically connected.

15. The collapsible cargo organizer of claim 14, wherein:
the front cover and the back cover are mechanically connected by one or more engagement hooks mechanically connected to one or more hook engagement receptacles, respectively.

16. The collapsible cargo organizer of claim 15, wherein:
the front cover comprises the one or more hook engagement receptacles;
the back cover comprises the one or more engagement hooks;
the one or more hook engagement receptacles each comprise an engagement lip protruding laterally in a hook engagement receptacle window; and
the one or more engagement hooks mechanically engage with the engagement lips of the one or more hook engagement receptacles, respectively.

17. The collapsible cargo organizer of claim 15, wherein:
the supporting base further comprises a gripper underlay; and
the gripper underlay underlies the floor plate.

18. The collapsible cargo organizer of claim 17, wherein:
the gripper underlay is formed of a polymer composition which is an elastomer; and
the gripper underlay is an injection molded underlay molded in-situ to the floor plate.

19. The collapsible cargo organizer of claim 17, wherein:
the gripper underlay includes a bumper which overlies an end of the floor plate at an opening/closing side of the rotatable panel.

20. A collapsible cargo organizer, comprising:
a rotatable panel;
a supporting base comprising a floor plate including a plurality of upwardly directed gripper projections connected to the floor plate and a plurality of downwardly directed gripper projections connected to the floor plate;
wherein the rotatable panel is rotatable from a horizontal position to a vertical position and vice-versa;
wherein, when the rotatable panel is in the vertical position, the rotatable panel provides a vertical panel to laterally support at least one article placeable in an article containing space of the collapsible cargo organizer which overlies the floor plate of the supporting base; and wherein the floor plate of the supporting base overlied by the article containing space when the rotatable panel is in the vertical position is covered by the rotatable panel when the rotatable panel is in the horizontal position.

21. A collapsible cargo organizer, comprising:

a rotatable panel;

a supporting base comprising a floor plate;

a hinge;

a hinge cover comprising a hinge receptacle;

the hinge disposed in the hinge receptacle;

the collapsible cargo organizer has a front side, a rear side, a left side and a right side;

the hinge cover is disposed out-board of the hinge at the rear side, the left side and the right side of the collapsible cargo organizer;

wherein the rotatable panel is rotatable from a horizontal position to a vertical position and vice-versa;

wherein, when the rotatable panel is in the vertical position, the rotatable panel provides a vertical panel to laterally support at least one article placeable in an article containing space of the collapsible cargo organizer which overlies the floor plate of the supporting base; and wherein the floor plate of the supporting base overlied by the article containing space when the rotatable panel is in the vertical position is covered by the rotatable panel when the rotatable panel is in the horizontal position.

22. A collapsible cargo organizer, comprising:

a rotatable panel;

a supporting base comprising a floor plate;

wherein the rotatable panel is rotatable from a horizontal position to a vertical position and vice-versa;

a releasable catch mechanism which releasably retains the rotatable panel in the vertical position;

wherein, when the rotatable panel is in the vertical position, the rotatable panel provides a vertical panel to laterally support at least one article placeable in an article containing space of the collapsible cargo organizer which overlies the floor plate of the supporting base; and wherein the floor plate of the supporting base overlied by the article containing space when the rotatable panel is in the vertical position is covered by the rotatable panel when the rotatable panel is in the horizontal position.

\* \* \* \* \*